US009058598B1

(12) United States Patent
Ll et al.

(10) Patent No.: US 9,058,598 B1
(45) Date of Patent: *Jun. 16, 2015

(54) SYSTEMS AND METHODS FOR DISTRIBUTION OF CASH

(71) Applicant: JPMorgan Chase Bank, N.A., New York, NY (US)

(72) Inventors: Timothy Tuo Ll, Westerville, OH (US); Ganesh Swaminathan, Mansfield, OH (US); James P. Sutton, Westerville, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/151,952

(22) Filed: Jan. 10, 2014

Related U.S. Application Data

(63) Continuation of application No. 12/173,394, filed on Jul. 15, 2008, now Pat. No. 8,657,187.

(60) Provisional application No. 61/020,257, filed on Jan. 10, 2008.

(51) Int. Cl.
*G06K 7/00* (2006.01)
*G06Q 20/10* (2012.01)
*G06Q 40/02* (2012.01)

(52) U.S. Cl.
CPC ............... *G06Q 20/10* (2013.01); *G06Q 40/02* (2013.01)

(58) Field of Classification Search
USPC .................... 235/375, 379, 380; 705/5, 35–45
See application file for complete search history.

(56) References Cited

U.S. PATENT DOCUMENTS

| 4,700,295 | A | 10/1987 | Katsof et al. |
|---|---|---|---|
| 5,799,288 | A | 8/1998 | Tanaka et al. |
| 6,006,196 | A | 12/1999 | Feigin et al. |
| 7,028,887 | B2 | 4/2006 | Chigira et al. |
| 7,219,083 | B2 | 5/2007 | Bellucci et al. |
| 7,340,415 | B1 | 3/2008 | Gasper et al. |
| 7,451,107 | B1 | 11/2008 | Chvala et al. |
| 7,813,972 | B2 | 10/2010 | Ramos et al. |
| 7,946,474 | B1 | 5/2011 | Agrawal |
| 8,005,728 | B2 | 8/2011 | Sadler et al. |
| 8,032,459 | B2 | 10/2011 | Lundblad |
| 8,341,077 | B1 | 12/2012 | Nichols et al. |

(Continued)

*Primary Examiner* — Matthew Mikels
(74) *Attorney, Agent, or Firm* — Hunton & Williams LLP

(57) ABSTRACT

The invention provides systems and methods for transferring cash to and from branch banks. The method may include the steps of inputting first data relating to cash usage at a plurality of branch banks; inputting second data relating to cash usage at the particular branch bank, the second data including a known ending balance at the particular branch bank; and assimilating the first data and the second data to constitute forecasting data; and performing forecast processing to determine an amount of cash to be transferred to or from the branch bank. The forecast processing may include (1) forecasting a cash in amount and forecasting a cash out amount based on the forecasting data, and generating a projected ending balance based on the forecasted cash in amount, the forecasted cash out amount, and the known ending balance; (2) generating a forecasted ending balance; and (3) comparing the projected ending balance with the forecasted ending balance to determine a cash shipment amount. The method may also include generating a cash transfer request based on the cash shipment amount; and effecting a transfer of cash with the branch bank based on the cash transfer request.

20 Claims, 22 Drawing Sheets

Banking cash distribution system 100

(56) References Cited

U.S. PATENT DOCUMENTS

| | | |
|---|---|---|
| 8,407,119 B2 | 3/2013 | Folk et al. |
| 8,556,167 B1 | 10/2013 | Nichols et al. |
| 8,577,802 B1 | 11/2013 | Nichols et al. |
| 8,657,187 B1 * | 2/2014 | Li et al. ............ 235/379 |
| 8,827,151 B2 | 9/2014 | Agrawal |
| 2004/0030622 A1 | 2/2004 | Ramos et al. |
| 2004/0158539 A1 | 8/2004 | Akita et al. |
| 2005/0108164 A1 | 5/2005 | Salafia et al. |
| 2006/0235739 A1 | 10/2006 | Levis et al. |
| 2006/0282277 A1 | 12/2006 | Ng |
| 2007/0174156 A1 | 7/2007 | Emde et al. |
| 2009/0319429 A1 | 12/2009 | Scully |
| 2010/0131407 A1 | 5/2010 | Folk et al. |

* cited by examiner

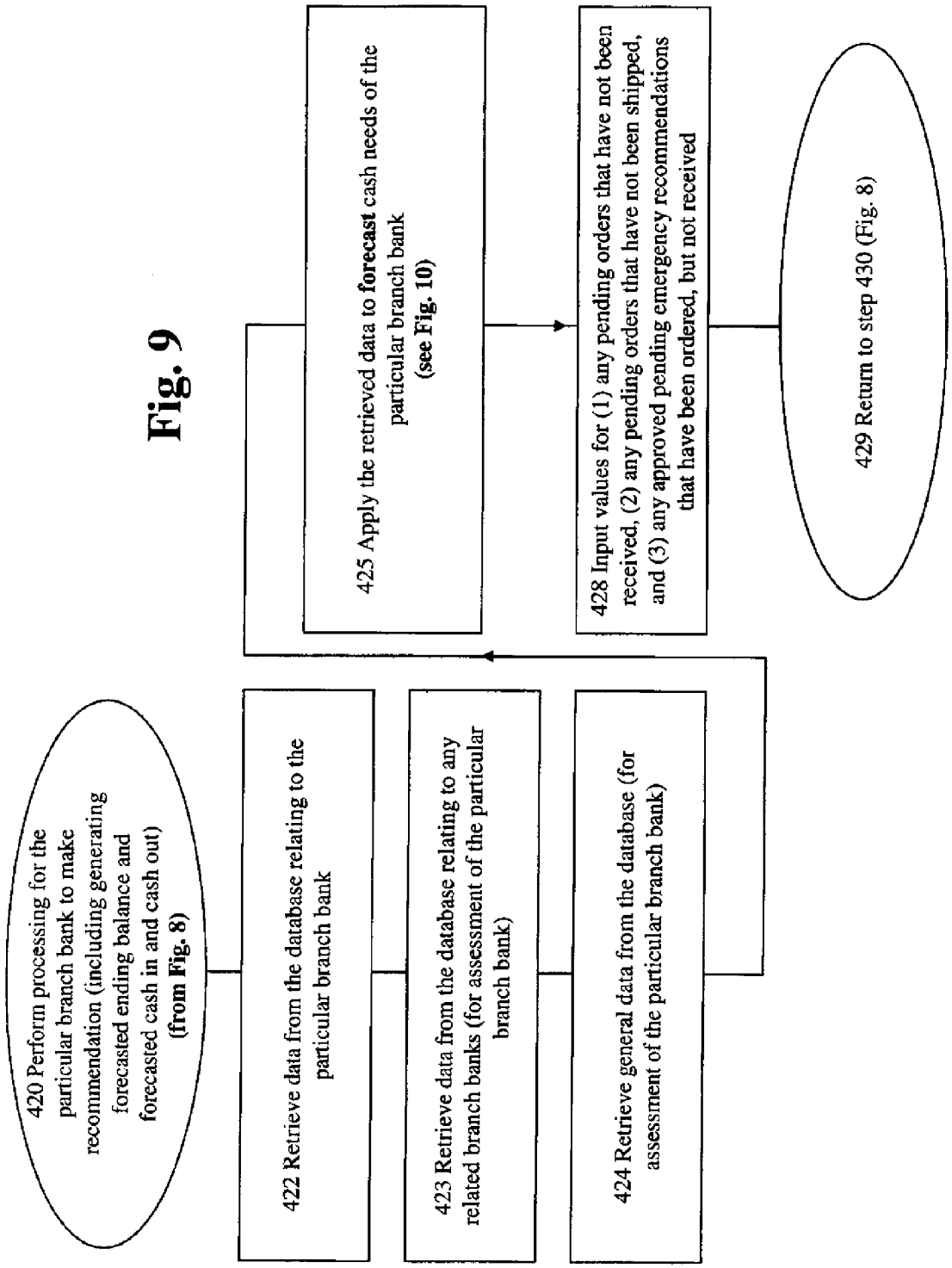

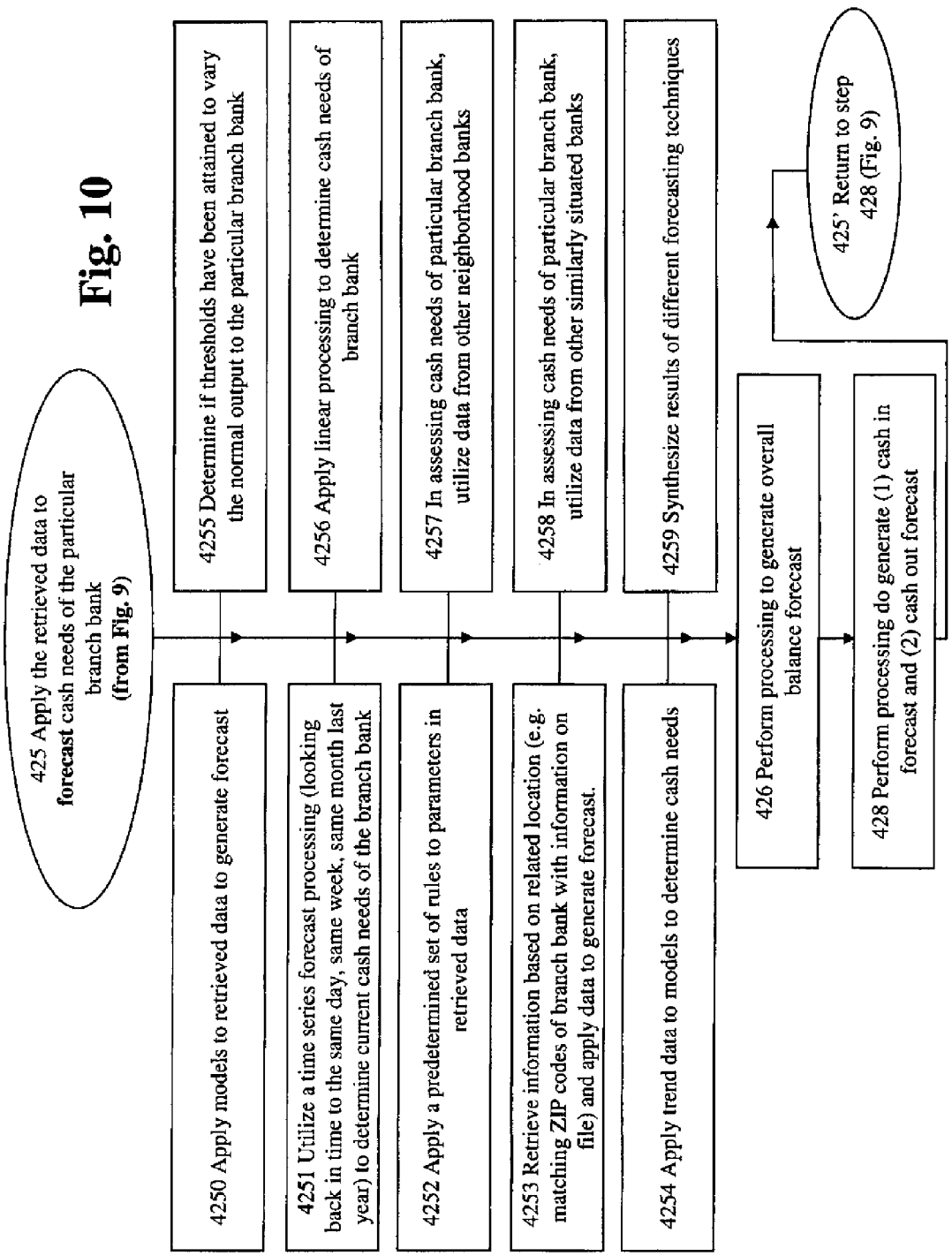

Fig. 11

| On Branch Order Day (Tuesday, Feb 13th) | | Example | | |
|---|---|---|---|---|
| Step | | | | |
| 1. System finds the last known actual ending balance. | = | $276,524 | | |
| 2. System adds the forecasted cash ins and subtracts the forecasted cash outs for the period between the last known actual ending balance and the day the courier is to arrive (including the day the courier is to arrive). | + | $45,200 | | |
| 3. System adds any pending order that has not been received. It subtracts any pending orders that has not been shipped. | + | | $19,915 | $301,809 |
| 4. System adds any approved pending emergency recommendations that have been ordered, but not received. This results in the projected ending balance for the day the courier is to arrive | + | | | $301,809 |
| 5. System subtracts the projected ending balance for the day the courier is to arrive from the forecasted ending balance for that day to calculate the real-time order or shipment amount | = | $316,891 | $301,809 | $301,809 |

⎫ 440 Perform processing to provide recommendation on branch bank order day (from Fig. 8)

| On Branch Shipment Day (Thursday, Feb 15th) | | Example | | |
|---|---|---|---|---|
| Step | | | | |
| 1. System finds the last known actual ending balance . ( Wednesday's Ending Balance ) | = | $300,482 | | |
| 2. System adds the forecasted cash ins and subtracts the forecasted cash outs for the day courier is to arrive. | + | $44,200 | $39,323 | $305,359 |
| 3. System adds any pending order that has not been received. It subtracts any pending orders that has not been shipped. | + | | | $320,441 |
| 4. System adds any approved pending emergency recommendations that have been ordered, but not received. This results in the projected ending balance for the day the courier is to arrive | + | | | $320,441 |
| 5. System subtracts the projected ending balance for the day the courier is to arrive from the forecasted ending balance for that day to calculate the real-time order or shipment amount | = | $316,891 | $320,441 | ($3,550) |

⎫ 450 Perform processing to provide recommendation on branch bank shipment day (from Fig. 8)

Fig. 17
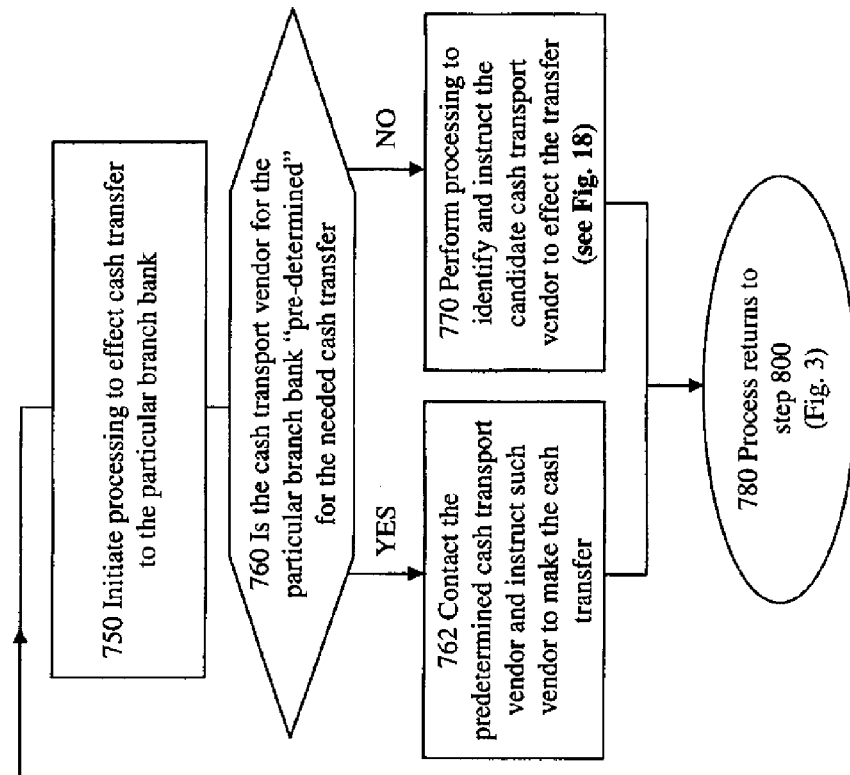
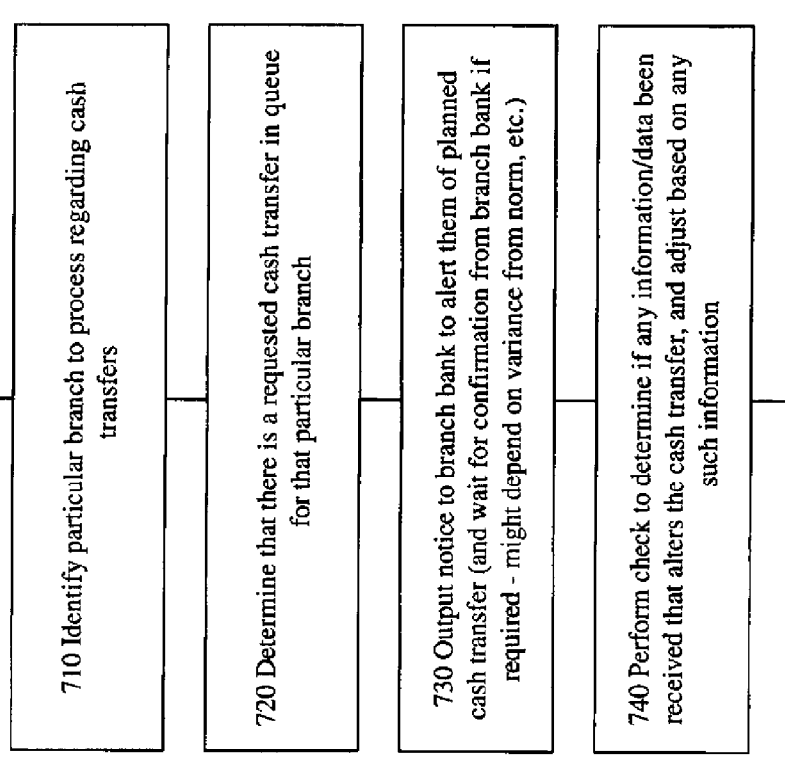

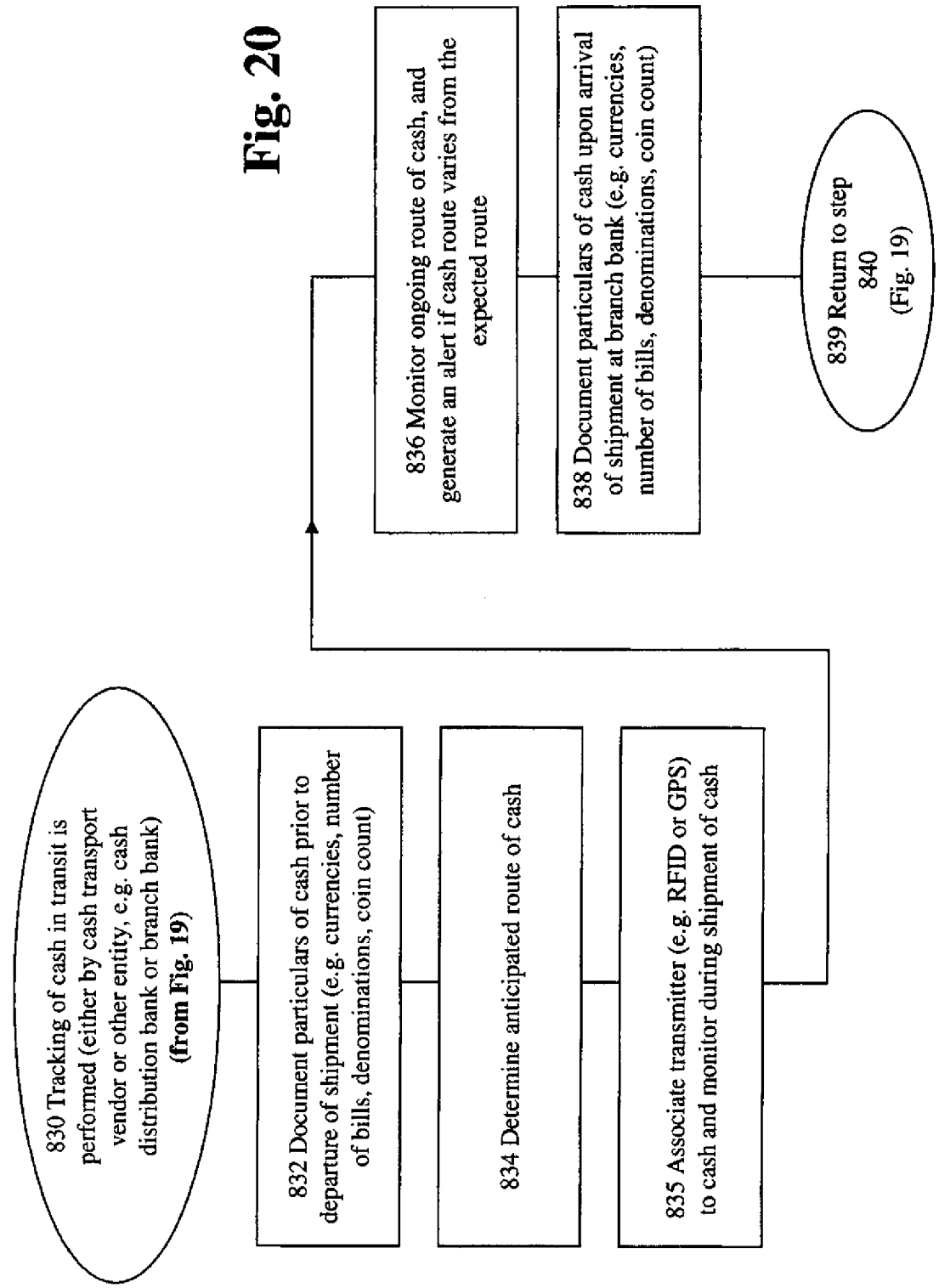

Fig. 21

My Cash Manager
Need to replenish your cash supply? Find out here!

Blotter | ATM Cash

Home > Sample District - Sample Cost Center Summary for Monday, September 10, 2007

ATM Cash Balance Summary

For more detailed balance information, click on an ATM ID.

Banking Center Serviced ATMs

| ATM ID | Last Transaction | Cash Balance |
|---|---|---|
| AB1234 | September 10, 2007 1:49 PM | $30,900 |

Vendor Serviced ATMs

| ATM ID | Last Transaction | Cash Balance |
|---|---|---|
| AB1235 | September 10, 2007 1:56 PM | $137,040 |
| AB1236 | September 10, 2007 1:57 PM | $115,240 |

For help with cash orders or recommendations, please call Banker Support at (866) 373-3991. Option 4, 6.

▶ Send Us Feedback

My Cash Manager

Need to replenish your cash supply? Find out here!

Home > Sample District - Sample Cost Center  Summary for Friday, August 10, 2007

| Branch Cash | ATM Cash |
| --- | --- |

Branch Cash Summary

| Day and Date | Ending Balance | Daily Activity |
| --- | --- | --- |
| Friday, Aug 17 | $401,400 (forecast) | Ship Out Cash Today! |
| Thursday, Aug 16 | $350,582 (forecast) | No Action |
| Wednesday, Aug 15 | $375,442 (forecast) | Order Cash Today! Arrives on Aug 17 |
| Tuesday, Aug 14 | $398,200 (forecast) | Ship Out Cash Today! |
| Monday, Aug 13 | $450,980 (forecast) | No Action |
| Sunday, Aug 12 | $380,396 (forecast) | No Action |
| Saturday, Aug 11 | $380,396 (forecast) | No Action |
| Friday, Aug 10 | $389,990 (forecast) | Order Cash Today! Arrives On Aug 14 |
| Thursday, Aug 09 | $378,947 (actual) | No Action |

Branch Cash Order History

| Order Date | Shipment Date | Amount | Confirmation | Status |
| --- | --- | --- | --- | --- |
| Aug 10, 2007 | Aug 21, 2007 | $1,000 | 00000000 | Order Request Received |
| Aug 10, 2007 | Aug 17, 2007 | $8,700 | 0001307 | Order Request Received |
| Aug 09, 2007 | Aug 14, 2007 | $5,000 | 0001310 | Order Packed. Scheduled To Arrive On Aug 14 |
| Aug 06, 2007 | Aug 10, 2007 | $7,500 | 0000505 | Order Packed. Scheduled To Arrive On Aug 10 |
| Aug 01, 2007 | Aug 03, 2007 | $8,700 | 0001307 | Order Packed. Scheduled To Arrive On Aug 03 |

Questions — call 888-888-8888

Important Messages

Order Cash Today!

Branch: $0
ATM: $50,000

Total: $50,000
(Arrives on Aug 14)

Aug Target: $489,610
MTD Actual: $470,600
Result: 3.89%

► Send Us Feedback

Fig. 22

SYSTEMS AND METHODS FOR DISTRIBUTION OF CASH

RELATED APPLICATION

This application claims is a Continuation of U.S. patent application Ser. No. 12/173,394 filed Jul. 15, 2008 and claims priority to U.S. Provisional Patent Application No. 61/020, 257 filed Jan. 10, 2008 and entitled SYSTEMS AND METHODS FOR DISTRIBUTION OF CASH, such applications are incorporated by reference herein in their entirety.

BACKGROUND OF THE INVENTION

Using known technology, branch banks typically individually determine how much cash is needed to maintain the services that they provide to their customers. As a result of branch banks erring on the "safe side," branch banks have tended to order substantially more cash than is needed. Such over-ordering puts much more cash in inventory than is needed to maintain the respective businesses. The excessive inventory results in substantial costs that could be avoided.

On the other hand, using prior techniques, branches sometimes order less than they need, and run out of cash. This results in needing an expedited transfer of cash. Such expedited transfers can be many times the cost of routine transfers.

In general, the prior technology is lacking in the coordination and optimization of transfers of cash.

SUMMARY OF THE INVENTION

Illustratively, the invention may relate to the transfer of cash from a central banking location to a branch location in a highly effective and efficient manner. The cash may be used for cash dispensers, vault cash and tellers, for example. The invention may also relate to effectively determining the need for cash and providing the cash based on that need. Further, the invention may also relate to other transfers of cash between various entities; various processing associated with the transfer and manipulation of cash reserves and cash inventories; the "ordering" of cash and associated processing; as well as selection of a vendor to transport cash, for example. Various other aspects and features of the invention are described below.

BRIEF DESCRIPTION OF THE DRAWINGS

The present invention can be more fully understood by reading the following detailed description together with the accompanying drawings, in which like reference indicators are used to designate like elements, and in which:

FIG. 9 is a flowchart showing the "perform processing for the particular branch bank to make recommendation (including generating forecasted ending balance and forecasted cash in and cash out)" processing of FIG. 8 in accordance with one embodiment of the invention;

FIG. 10 is a flowchart showing the "apply the retrieved data to forecast cash needs of the particular branch bank" processing of FIG. 9 in accordance with one embodiment of the invention;

FIG. 11 is a diagram showing processing to provide a recommendation of cash transfer on branch bank order day and branch bank shipment day (step 440 and 450 of FIG. 8) in accordance with one embodiment of the invention;

FIG. 17 is a flowchart showing the "the requests for cash for branch banks are processed to determine the cash transport vendor to utilize" processing of FIG. 3 in accordance with one embodiment of the invention;

FIG. 20 is a flowchart showing the "tracking of cash in transit is performed (either by cash transport vendor or other entity, e.g. cash distribution bank or branch bank)" processing of FIG. 19 in accordance with one embodiment of the invention;

FIG. 21 is a diagram showing a user interface displaying a summary of branch cash in accordance with one embodiment of the invention; and FIG. 22 is a diagram showing a user interface displaying a summary of ATM balances over a period of time in accordance with one embodiment of the invention.

DETAILED DESCRIPTION OF THE INVENTION

Figure 1:
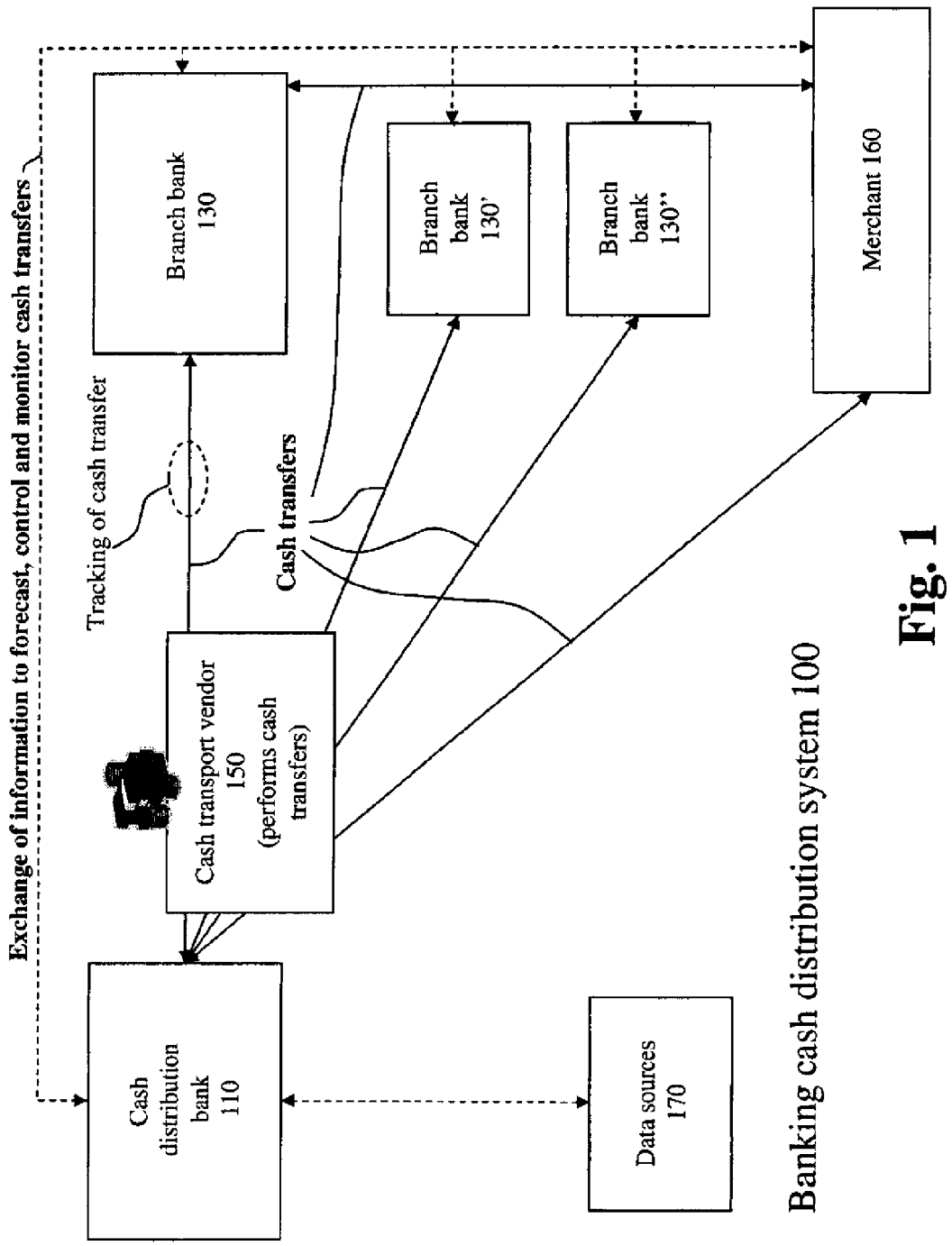
FIG. 1 is a block diagram showing components of, and exchanges within, a banking cash distribution system in accordance with one embodiment of the invention.

Hereinafter, aspects in accordance with various embodiments of the invention will be described. As used herein, any term in the singular may be interpreted to be in the plural, and alternatively, any term in the plural may be interpreted to be in the singular.

Illustratively, the invention relates to the transfer of cash from a central banking location to branch locations in a highly effective and efficient manner. However, the invention also relates to other transfers of cash, such as between two branch banks, or between a store and a branch bank, for example. The transferred cash may be for a variety of purposes. For example, the cash may be used for cash dispensers, vault cash and tellers. In particular, the invention relates to effectively determining the need for cash and providing the cash based on that need. In estimations performed, the systems and methods of embodiments of the invention may require one third of the cash inventories, as was required using prior techniques. The invention may relate to various processing associated with the transfer and manipulation of cash reserves and cash inventories. The invention may also relate to the "ordering" of cash and associated processing. Various other aspects and features of the invention are described below.

A processing "tool" of the invention may be characterized as a cash management tool (hereinafter the "Tool"). The Tool generates forecasts relating to the anticipated cash needs and anticipated balances. The forecasting performed by the Tool may take into account a variety of factors, including historical data, pending cash orders, and a prior period's (e.g. yesterday's) actual ending balance of the particular branch. The Tool uses optimization processes and mathematical modeling. The Tool is essentially a real time ordering/recommendation tool. The forecast may relate to the next day or the next week, for example. In short, the invention brings a specific, effective methodology to cash management, in contrast to a somewhat chaotic system, under the prior technology. The systems and methods of embodiments have wide application. For example, the features of the invention may be utilized with branch service ATMs. Features of the invention may also be used in the commercial banking environment. The Tool may use "time series" forecasting methodology. This relates to historical information as to a "what happened last year at this time" analysis, for example.

The invention takes into account a variety of information. Such events might be a local event, a time of year (e.g. Christmas), or a disaster event, for example. Deteriorations may be taken into account in the forecasting. Activities in other branches may be taken into account. For example, if one ATM goes down, the cash available in a nearby ATM could be augmented in an appropriate manner.

In summary, the invention may be characterized as taking into account information from the "big picture" (i.e., all the branches) and information from a particular branch, so as to generate a forecast for that particular branch. In an ongoing manner, the Tool learns based on data received, so as to recalculate and recalibrate.

The invention provides an effective way of tracking cash. Such tracking may utilize electronic information, a physical tracking of the cash, and suitable tags associated with the cash. The tracking may utilize global positioning technology (GPS). A central location may be in communication with a branch location, such that the central location can be alerted to cash deficiencies in a real time manner and to allow the central location to take appropriate action. Various information may be exchanged between the cash distribution bank, branch banks and other entities in real time.

The invention may also relate to the manner of transferring cash. For example, cash is often transferred using a vendor. The vendor has varying logistical constraints, thus resulting in the availability and costs of transfers varying over time. Thus, the Tool provides a strategic coordination of resources and need to transfer cash, such as between branches. In one aspect, the Tool may provide for the input and processing of bids (from vendors) to transfer cash (in response to a need to transfer the cash).

The invention also relates to the exchange and accessibility of information related to transfers of cash. Thus, one branch is provided with information relating to other branch information, e.g. related to cash transfers. Information may be selectively provided by non-bank entities so as to coordinate the effective transfer of needed cash, e.g. a bank might selectively download information from a retail merchant regarding cash taken in by the merchant on a particular day, and make forecasts and transfers accordingly.

As described below, the invention may utilize various pieces of technology, each constituting inventive features in and of themselves. (1). The invention relates to a methodology for transferring cash between central banking locations (i.e., cash distribution banks), bank branches, store entities, and other entities, including methodology, information exchange and user interface (computer interface). Such transfer of cash may employ optimization techniques, in accordance with one embodiment of the invention. (2). The invention may include a mathematical model for effectively transferring cash between central banking locations, bank branches, store entities, and other entities. (3). The invention may provide systems and methods for coordinating the transfer of cash with available transfer resources, such as couriers (e.g. BRINKS). The invention may include various features, such as vendors bidding for a needed cash transfer.

It is appreciated that the "cash transfers" as described herein relate to transfers of cash to (or from) a cash distribution bank, a branch bank or some other entity. Thus, the features described herein relating to a shipment of cash to a branch bank (or cash distribution bank) might also be applied to a shipment of cash from a branch bank (or cash distribution bank). Further, features relating to a shipment of cash from a branch bank (or cash distribution bank) might also be utilized in a shipment of cash to a branch bank (or cash distribution bank).

The "cash distribution bank" as described herein means a banking entity that is tasked with the distribution of cash to the various banks it serves, i.e., the branch banks it serves. Further, "cash" as described herein means physical currency that may be physically exchanged with a customer, including different denominations of bills and coins, for example.

A "branch bank" as used herein means any banking entity, operating under a cash distribution bank, that dispenses cash to and/or takes cash in from customers. Accordingly, an ATM constitutes a branch bank, as well as the more traditional structure with teller windows.

FIG. 1 is a block diagram showing components of, and exchanges within, a banking cash distribution system 100 in accordance with one embodiment of the invention.

As shown, the banking cash distribution system 100 includes various components including a cash distribution bank 110 and a plurality of branch banks 130. The illustrative banking cash distribution system 100 further includes at least one cash transport vendor 150, a merchant 160, as well as data sources 170. In the systems and methods of the invention, cash gets transported between the cash distribution bank 110 and the various branch banks 130. In some embodiments, cash can be transferred between branch banks 130. Further, in yet additional embodiments, cash can be transferred between the branch banks 130 and the merchant 160, as well as between the merchant 160 and the cash distribution bank 110. In accordance with some embodiments of the invention, the transfer of cash between the entities of FIG. 1 are performed utilizing a cash transport vendor 150. For example, the cash transport of vendor 150 might be in the form of an armored car service.

In conjunction with the transfer of cash as reflected in FIG. 1, the invention also relates to the exchange of information between the cash distribution bank 110, the branch bank 130, the merchant 160, the cash transport vendor 150, and various other data sources 170, for example. As described in detail below, such exchanged information is utilized, in accordance with the embodiments of the invention, to strategically and effectively transfer cash between the components in the cash distribution system 100.

Figure 2:
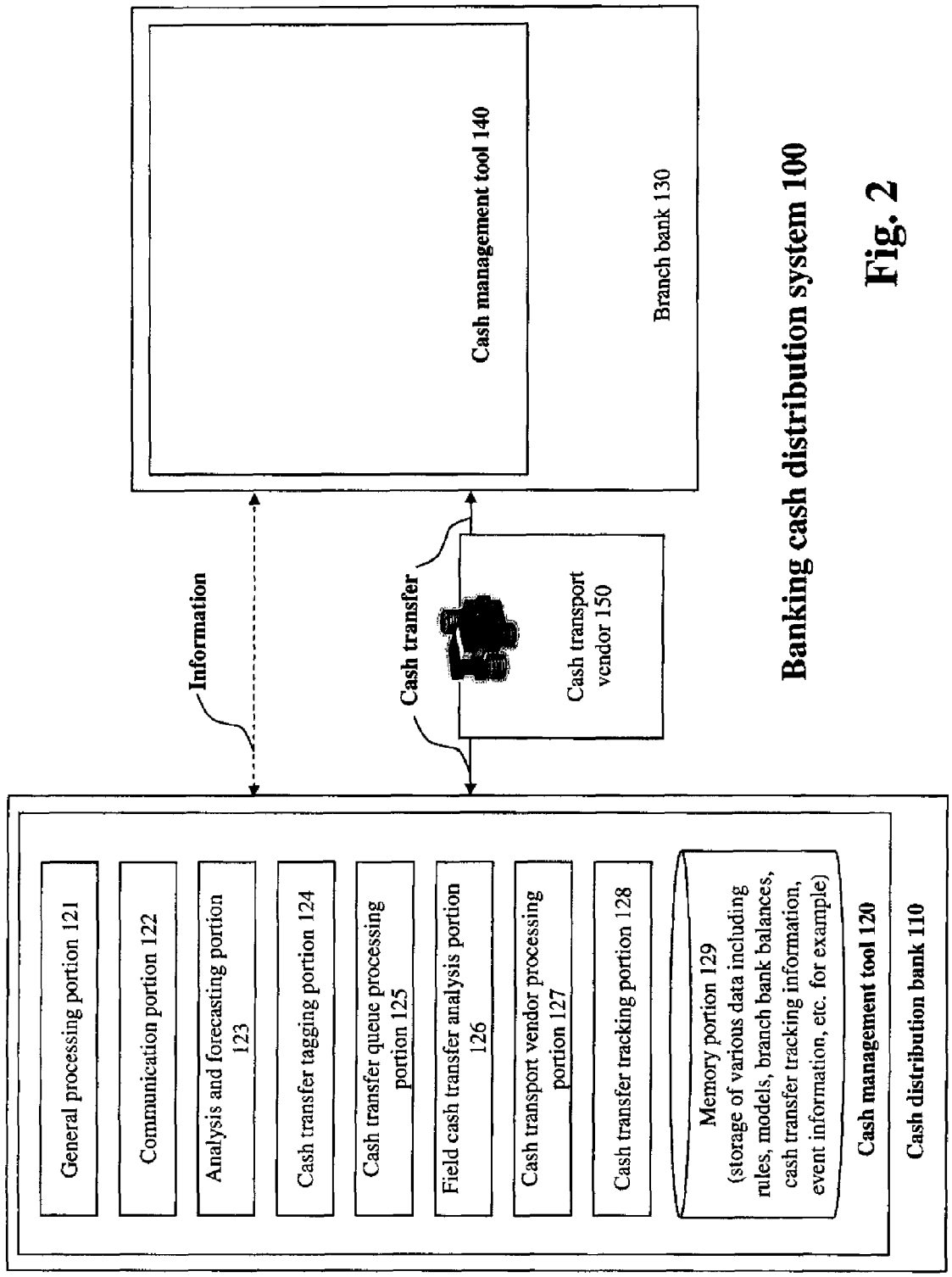
FIG. 2 is a block diagram showing further details of the components of FIG. 1 in accordance with one embodiment of the invention.

FIG. 2 is a block diagram showing further details of the components of FIG. 1 in accordance with one embodiment of the invention. In particular, FIG. 2 shows further details of a cash management tool 120 in the cash distribution bank 110. The cash management tool 120, as well as a cash management tool 140 (in the branch bank 130) may constitute the cash management Tool, as described above.

The cash management tool 120 includes a variety of processing components, as shown. The general processing portion 121 performs the various processing in the cash management tool 120, except as otherwise performed by the specialized processing components 122-129, as described herein.

Hereinafter, the specialized processing components 122-129 are described in turn. The various processing performed by the processing components 121-129 are described below.

The communication portion 122 performs a variety of communication related processing including inputting and outputting data. In general, the banking cash distribution system 100 is provided with suitable communications systems such that data may be exchanged between the various components shown in FIGS. 1 and 2.

The analysis and forecasting portion 123 performs a wide variety of forecast related processing. For example, the analysis and forecasting portion 123 may include and utilize models and rule sets to generate forecasts of cash balances, cash inputs, cash outputs, and to perform various other related processing.

The cash transfer tagging portion 124 functions to associate "tags" with a cash transfer request, in response to a suitable instruction. The tag might result from a need for an urgent cash transfer. The cash transfer tagging portion 124 might associate a particular instruction to a cash transfer, e.g. that a particular person should be alerted upon delivery of the cash transfer, for example.

The cash transfer queue processing portion 125 handles the queuing of cash transfer requests. That is, in accordance with one embodiment of the invention, once the analysis and forecasting portion 123 generates a cash transfer request, such request is placed into a queue. The cash transfer tagging portion 124 then manages such queued cash transfers, including serving up the queued cash transfer for processing, at a particular time. The particular time might be a certain day, a certain time of the day, or in response to a particular received instruction, for example.

The field cash transfer analysis portion 126 handles processing associated with field cash transfers. That is, a cash transfer as described herein may involve a "field cash transfers" meaning herein that the cash transfer is not with a cash distribution bank; but rather the cash transfer is between two branch banks and/or between a branch bank and some other entity. The field cash transfer analysis portion 126 handles the assessment of whether a field cash transfer should be performed between two entities, and the implementation of such field cash transfer, as well as various related processing.

The cash transport vendor processing portion 127 handles processing associated with selecting and interacting with a cash transport vendor. For example, the cash transport vendor processing portion 127 may handle the cash transport vendor bidding processing, as described below.

The cash transfer tracking portion 128 handles processing associated with tracking a cash transfer. For example, the cash transfer tracking portion 128 might utilize RFID (Radio-frequency identification) technology and/or GPS (Global Positioning System) technology. As described below, the cash transfer tracking portion 128 might compare an anticipated cash transfer route with the actual route being traveled, so as to monitor the cash transfer.

The cash management tool 120 also includes a memory portion 129. The memory portion 129 serves as the data storage facility for the cash management tool 120. Accordingly, the various data as described below, including rules, models, balance information, and a wide variety of other data, are stored in the memory portion 129, in accordance with one embodiment of the invention.

The branch bank 130 also may contain a cash management tool 140, in accordance with one embodiment of the invention. The cash management tool 140 may include the same or similar processing components as those contained in the cash management tool 120.

Figure 3:
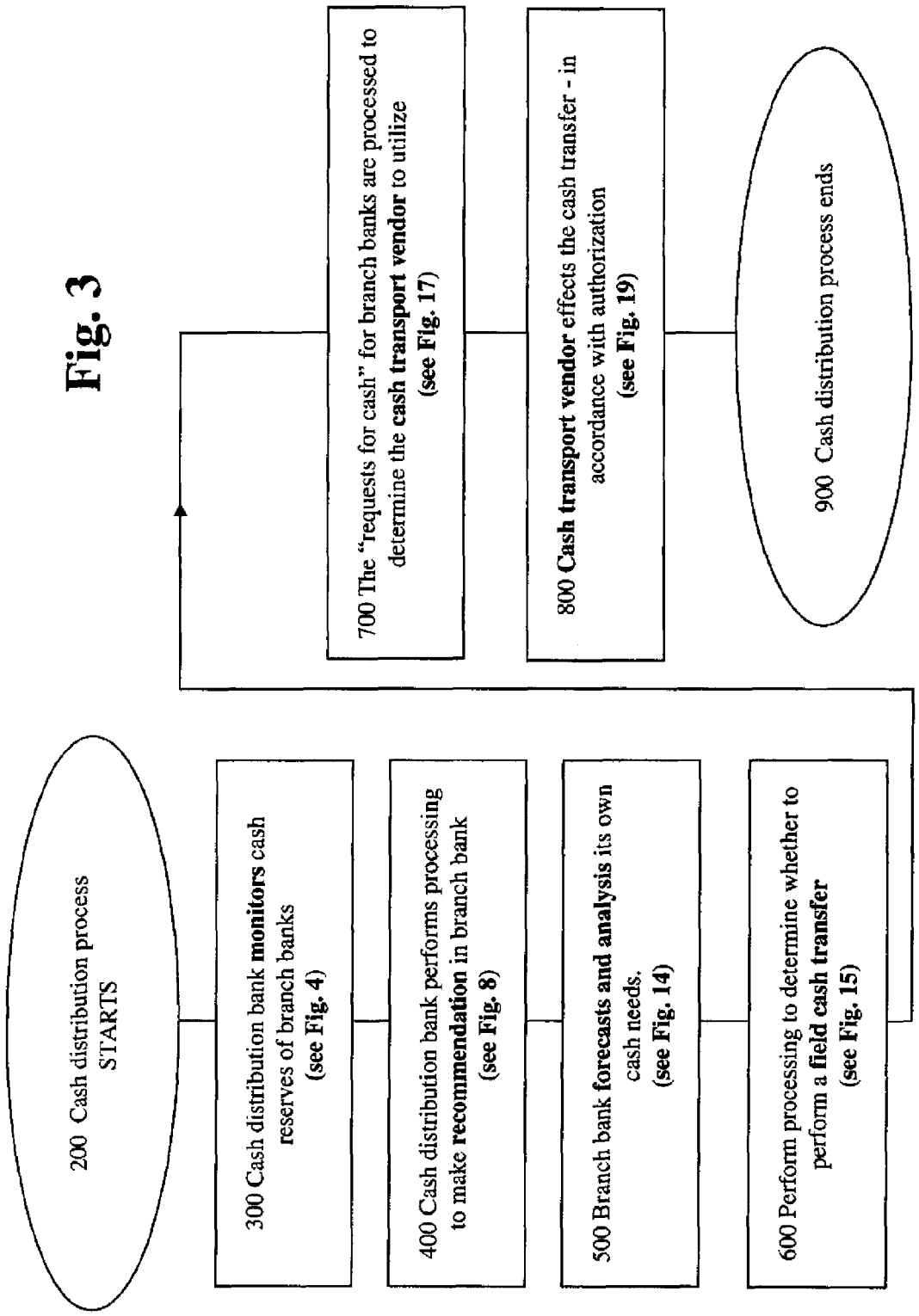
FIG. 3 is high level flowchart showing a cash transfer process in accordance with one embodiment of the invention.

FIG. 3 is high level flowchart showing a cash transfer process in accordance with one embodiment of the invention. The processing of FIG. 3 might be performed at least in part by the general processing portion 121 and/or the other processing portions 122-129, as described below, for example. As shown, the process starts in step 200 and passes to step 300.

In step 300, the cash distribution bank monitors cash reserves of branch banks. Further details of such processing are described below with reference to FIG. 4.

After step 300, the process passes to step 400. In step 400, the cash distribution bank performs processing to make recommendations to a branch bank regarding cash transfers. Further details of such processing are described below with reference to FIG. 8.

Then, the process passes to step 500. In step 500, the branch bank forecasts and analyses its own cash needs. That is, in accordance with one embodiment of the invention, the branch bank may forecast its own cash needs. Further details of such processing are described below with reference to FIG. 14.

After step 500 of FIG. 3, the process passes to step 600. In step 600, the process performs processing to determine whether to perform a field cash transfer. Further details of such processing are described below with reference to FIG. 15.

Then, in step 700, the various "requests for cash" for branch banks are processed to determine the cash transport vendor to utilize. Further details of such processing are described below with reference to FIG. 17. After step 700 of FIG. 3, the process passes to step 800.

In step 800, the cash transport vendor effects the cash transfer in accordance with the authorization, which they have been provided. Further details of such processing are described below with reference to FIG. 19. Thereafter, the process passes to step 900.

In step 900 of FIG. 3, the cash distribution process ends.

Accordingly, FIG. 3 illustrates a process of cash transfer described in a high level manner. Hereinafter, the various particulars of such processing will be described.

Figure 4:
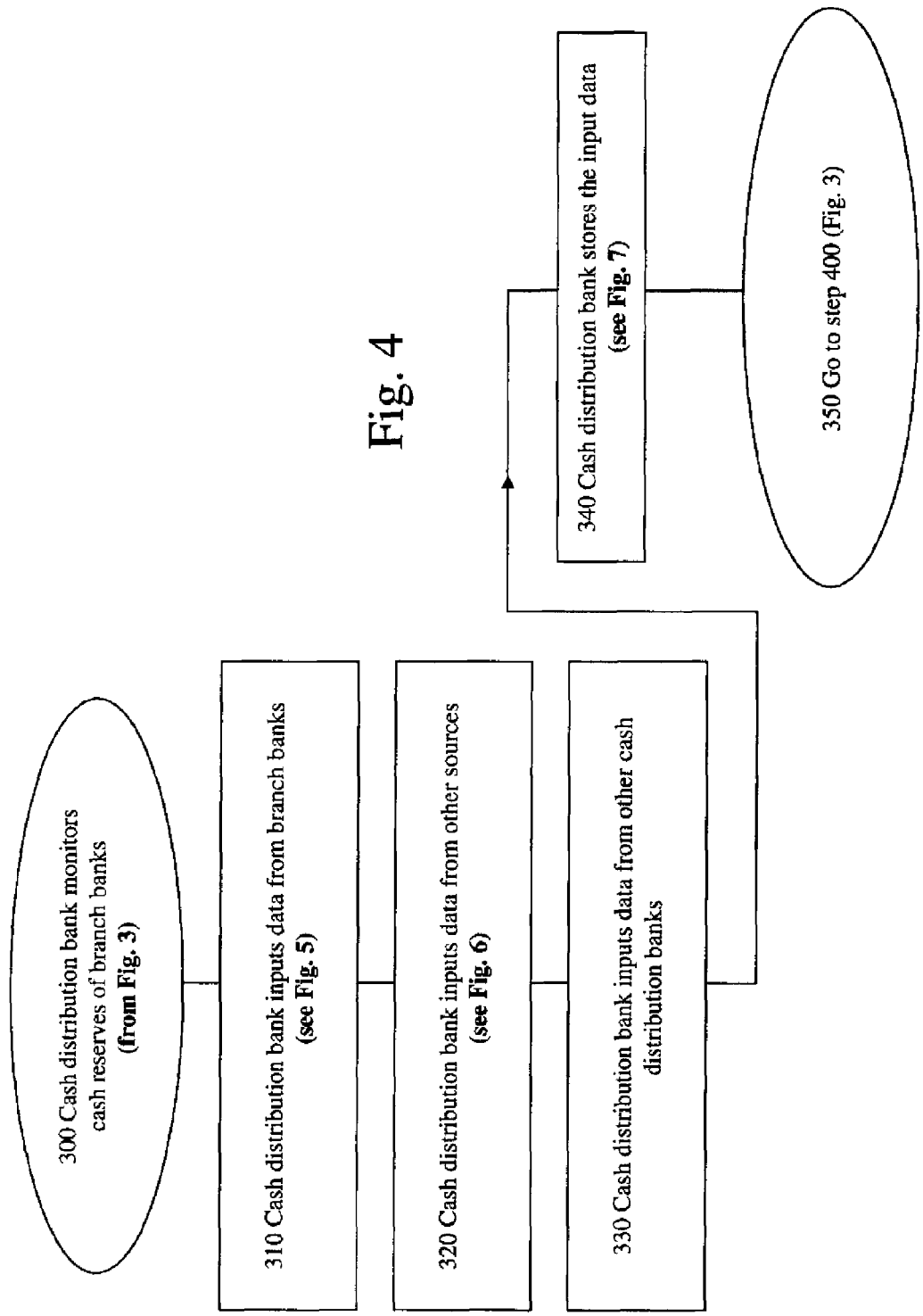
FIG. 4 is a flowchart showing the "cash distribution bank monitors cash reserves of branch banks" processing of FIG. 3 in accordance with one embodiment of the invention.

FIG. 4 is a flowchart showing the "cash distribution bank monitors cash reserves of branch banks" step 300 of FIG. 3, in accordance with one embodiment of the invention.

As shown, the sub-process of FIG. 4 starts in step 300 and passes to step 310. In step 310, the cash distribution bank inputs data from various branch banks. Further details of the processing of step 310 are described below with reference to FIG. 5. After step 310 of FIG. 4, the process passes to step 320. In step 320, the cash distribution bank inputs data from various other sources. Further details of the processing of step 320 are described below with reference to FIG. 6.

Thereafter, in step 330 of FIG. 4, the cash distribution bank inputs data from other cash distribution banks. That is, it is appreciated that the cash distribution bank 110 may be associated with other cash distribution banks in one way or another. The association may result from common ownership, for example.

After step 330, the process passes to step 340. In step 340, the cash distribution bank stores the various data that the cash distribution bank has input. Further details of the processing of step 340 are described below with reference to FIG. 7. After step 340, the process passes to step 350. Step 350 of FIG. 4 reflects that the process returns to step 400 of FIG. 3.

Figure 5:
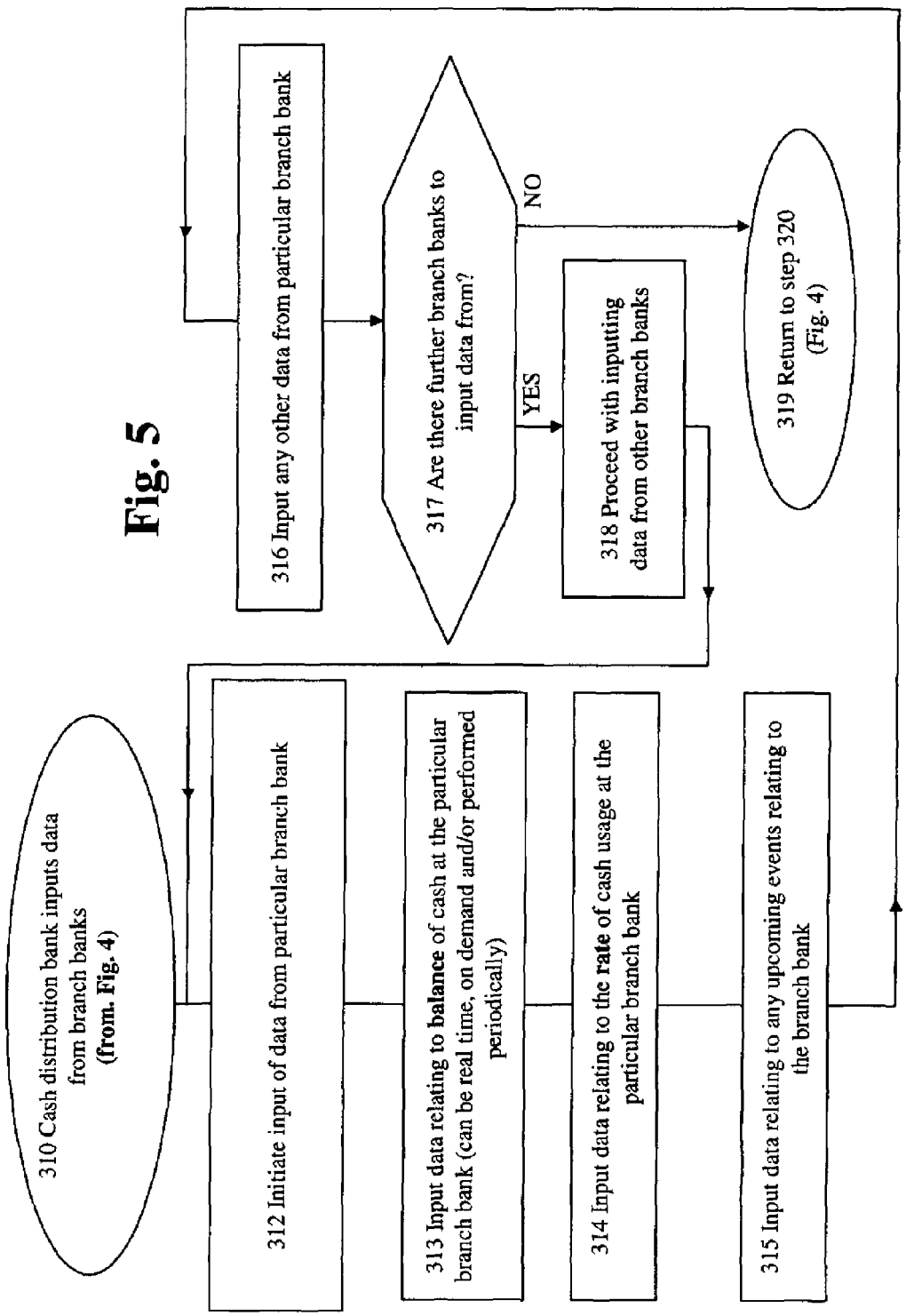
FIG. 5 is a flowchart showing the "cash distribution bank inputs data from branch banks" processing of FIG. 4 in accordance with one embodiment of the invention.

FIG. 5 is a flowchart showing the "cash distribution bank inputs data from branch banks" step 310 of FIG. 4 in accordance with one embodiment of the invention.

The process of FIG. 5 starts in step 310 and passes to step 312. In step 312, the process initiates the input of data from a particular branch bank. That is, the "particular branch bank" is a bank which the cash distribution bank monitors with regard to cash reserves and either sends cash to, or receives cash from, such branch bank, i.e., so as to maintain the cash reserves of the particular branch bank at a desired level.

After step 312 of FIG. 5, the process passes to step 313. In step 312, the process inputs data relating to the balance of cash at the particular branch bank. For example, this input data may be data relating to the balance of cash at an ATM of the branch bank, the overall cash balance at the branch bank, or any other cash resource at the particular branch bank. It is appreciated that this input of data may be performed in real time, on demand, and/or periodically in some predetermined and desired manner, for example. For example, the cash balances may be input at the end of every business day. For example, an "on demand" request might occur in conjunction with a forecast request of the cash distribution bank, i.e., that the cash distribution bank make a recommendation of cash shipment to the particular branch bank.

After step 313 of FIG. 5, the process passes to step 314. In step 314, the process inputs the data relating to the rate of cash usage of the particular branch bank. As in step 313, this rate of usage might be input to the cash distribution bank in real time, in some periodic manner, or on demand. Further, it is appreciated that variants in the input balances of cash may well disclose rate of usage of cash in a sufficient manner. However, in addition, it may also be desirable to indeed input a rate of cash usage (as reflected in step 314), for example, by inputting the cash output from a teller (or ATM) in real time.

Then, in step 315 of FIG. 5, the process inputs data related to upcoming events relating to the branch bank. Such upcoming events, in accordance with one embodiment, are indeed provided by persons at the branch bank, and output to the cash distribution bank in step 315. For example, such upcoming events might include community events (which the cash distribution bank would otherwise not be aware of), weather events affecting the branch bank, or any other upcoming event. After step 315 of FIG. 5, the process passes to step 316.

In step 316, the process inputs any other data from the particular branch bank. That is, it is appreciated that data other than the data conveyed in steps 313, 314, and 315 might also be input from the branch bank into the cash distribution bank. For example, such additional data might include a recent change in services provided by the particular branch bank. After step 316, the process passes to step 317. Step 317 reflects that there are various branch banks from which the cash distribution bank will input data. Thus, in step 317, a determination is made whether there are other branch banks to input data from. If yes, then the process passes to step 318. In step 318, the process proceeds with inputting data from the other branch banks. Accordingly, the process returns to step 312 and continues as described above.

Alternatively, if no in step 317, i.e., there are no other branch banks to input data from, then the process passes to step 319. In step 319, the process returns to step 320 of FIG. 4.

Figure 6:
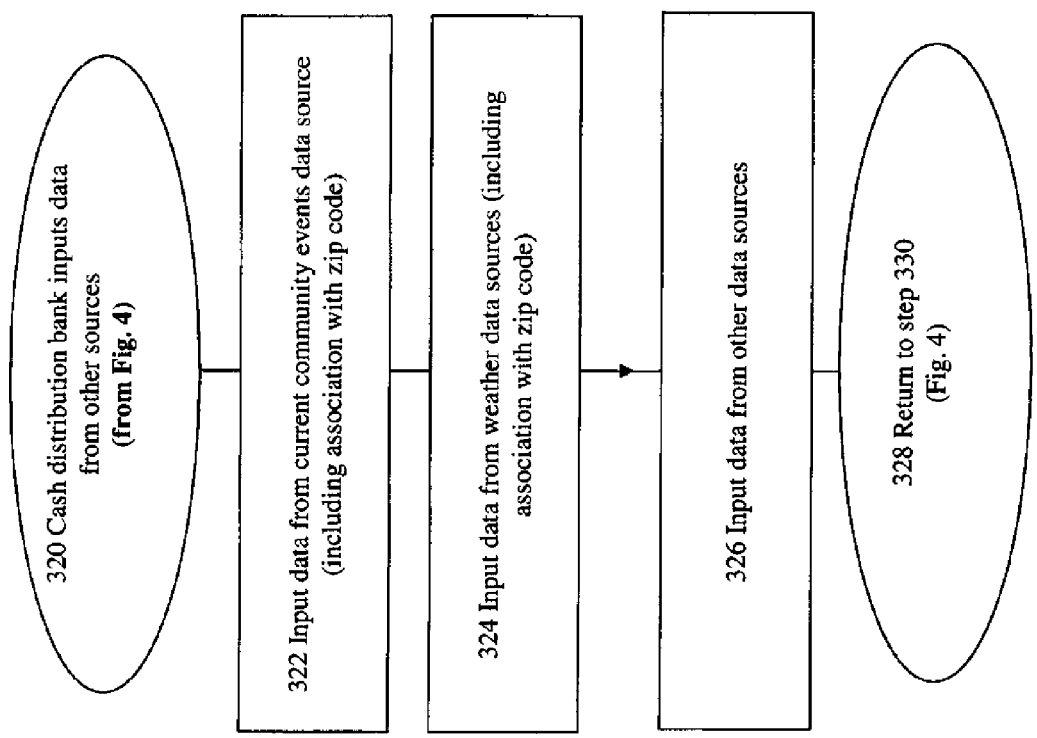
FIG. 6 is a flowchart showing the "cash distribution bank inputs data from other sources" processing of FIG. 4 in accordance with one embodiment of the invention.

FIG. 6 is a flowchart showing the "cash distribution bank inputs data from other sources" step 320 of FIG. 4 in accordance with one embodiment of the invention.

As shown, the processing of FIG. 6 starts at step 320, and passes to step 322. In step 322, the process inputs data from a current community events data source. That is, in accordance with some embodiments of the invention, the cash distribution bank has data sources other than the branch banks. Such other data sources might be a community calendar for example. The community event (that is input) may be associated with a zip code (or in some other manner be geographically defined.) As a result, the cash distribution bank may associate the particular community event (which is associated with a zip code) with branch banks bearing the same or similar zip code. Decisioning (relating to the particular branch bank in the geographical area of the upcoming community event) may then be based on such upcoming community event.

After step 322, the process then passes to step 324. In a similar manner to step 322, in step 324, the process inputs data from weather data sources including association of such weather data with zip codes. The association of weather alerts with zip codes allows such weather alerts to in turn be associated with particular branch banks. After step 324, the process passes to step 326.

Step 326 reflects that yet additional data may be input from other sources. This additional data may also be used to effectively and strategically transfer cash between the cash distribution bank, branch banks, as well as merchants. After step 326 of FIG. 6, the process passes to step 328. In step 328, the process returns to step 330 of FIG. 4.

Figure 7:
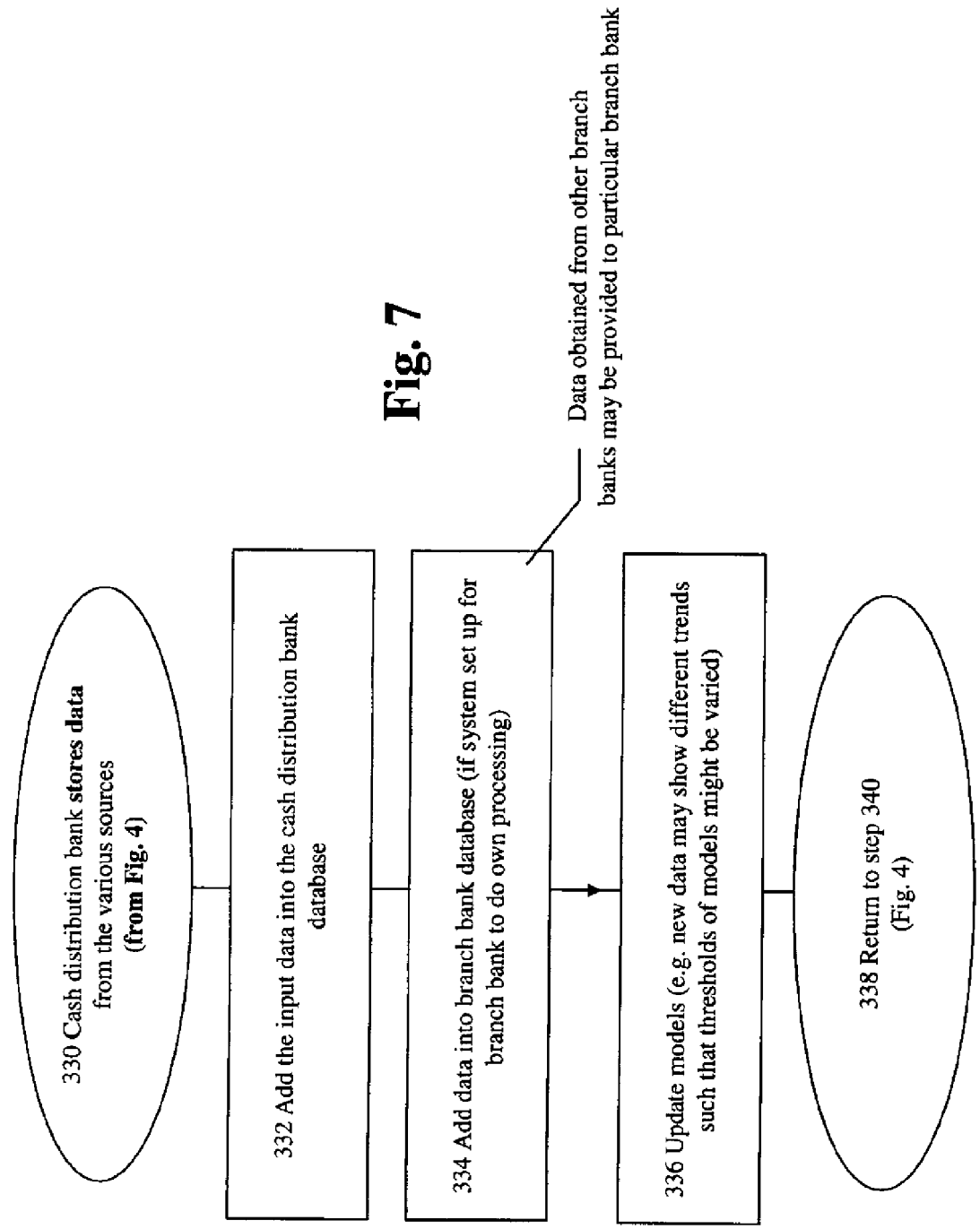
FIG. 7 is a flowchart showing the "cash distribution bank stores data from the various sources" processing of FIG. 4 in accordance with one embodiment of the invention.

FIG. 7 is a flowchart showing the "cash distribution bank stores data from the various sources" step 330 of FIG. 4 in accordance with one embodiment of the invention.

The process of FIG. 7 starts in step 330 and passes to step 332. In step 332, the process adds the various input data into the cash distribution bank database, e.g. the memory portion 129. Then, the process passes to step 334. In step 334, data is in turn added into the branch bank databases. That is, in accordance with one embodiment of the invention, the branch banks may be provided with the processing ability to perform their own processing, i.e., to forecast recommended cash transfers and balances, for example. Thus, the various data that is used in the cash distribution bank to perform such forecasting may be output to particular branch banks, such that the branch banks may in turn do their own forecasting. This exchange of information is reflective of the feature of the invention that data input from various branch banks and other sources may be used to forecast cash levels at a particular branch bank. Thus, this might be characterized as using data from the big picture to assess needs in the small picture (of a single branch bank).

After step 334, the process of FIG. 7 passes to step 336. In step 336, models are updated in response to newly added data. That is, step 336 is reflective that newly input data may be utilized to update various aspects of the forecasting, such as the models used in the forecasting. Other mechanisms used in the forecasting may also be updated, such as rules that are used in the forecasting. Illustratively, the new data may show different trends such that thresholds of models might be varied in response to such new trends. After step 336, the process passes to step 338. In step 338, the process returns to step 340 of FIG. 4.

Figure 8:
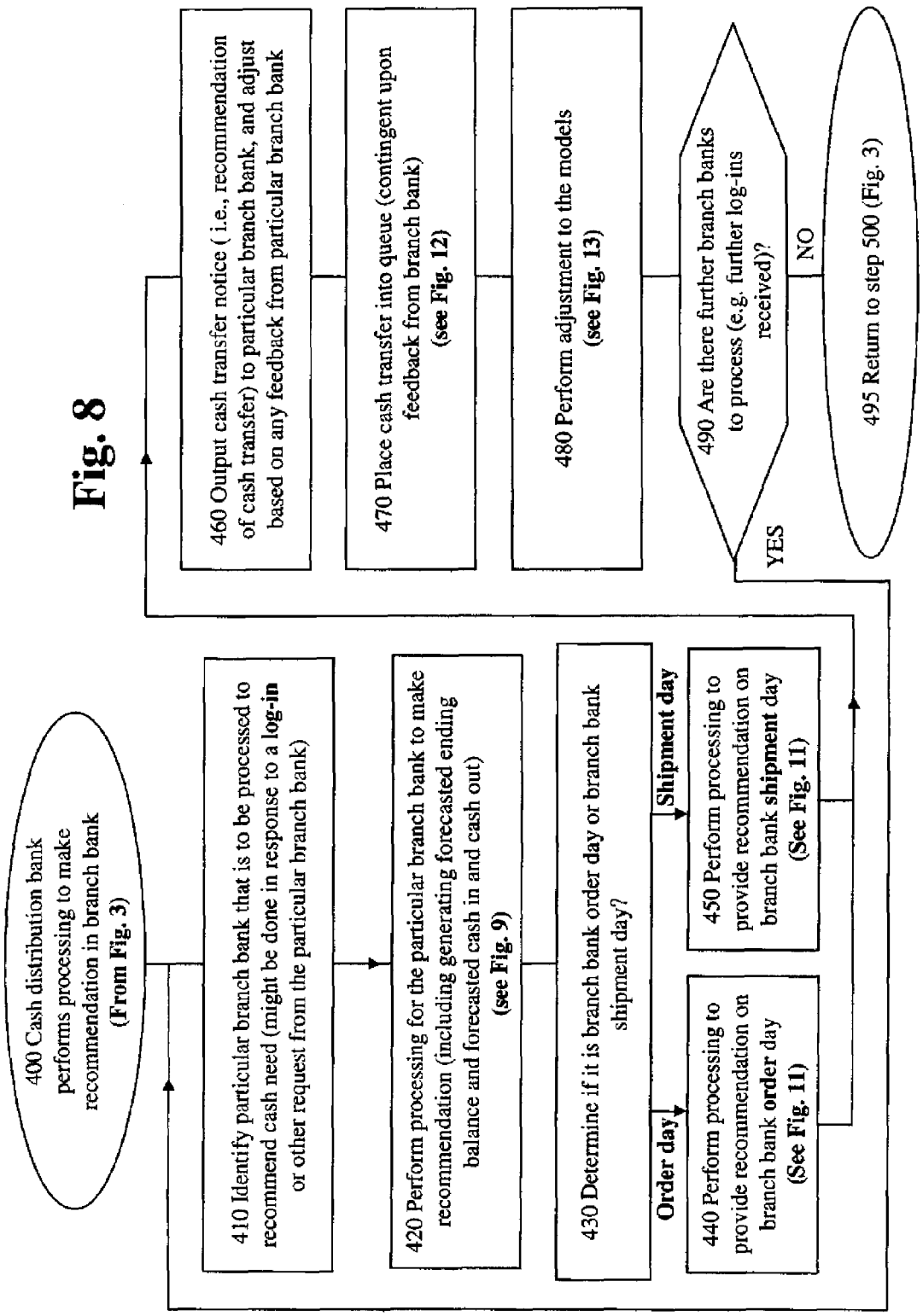
FIG. 8 is a flowchart showing the "cash distribution bank performs processing to make recommendation in branch bank" processing of FIG. 3 in accordance with one embodiment of the invention.

FIG. 8 is a flowchart showing the "cash distribution bank performs processing to make recommendation in branch bank" step 400 of FIG. 3, in accordance with one embodiment of the invention. The processing of FIG. 8 might be performed at least in part by the analysis and forecasting portion 123, for example.

The process of FIG. 8 starts in step 400 and passes to step 410. In step 410 of FIG. 8, the process identifies a particular branch bank that is to be processed so as to recommend a cash need for that branch bank. For example the identification of the particular branch bank might be done in response to an administrator at the branch bank logging in, or some other trigger event. Alternatively, the identification of a branch bank might be done in some periodic or rolling manner.

After step 410, the process passes to step 420. In step 420, the process performs processing for the particular branch bank to make recommendations including generating forecasted ending balance and forecasted cash in as well as cash out. Further details of the processing of step 420 are described below with reference to FIG. 9. After step 420 of FIG. 8, the process passes to step 430.

In step 430, a determination is made, whether it is branch bank order day or branch bank shipment day. That is, the processing is somewhat different depending on whether it is an order day or a shipment day, in accordance of one embodiment of the invention. If it is branch bank order day, the process passes to step 440. In step 440, further processing is performed to provide a recommendation to the branch bank on the order day. This processing is described below with reference to FIG. 11. On the other hand, if it is shipment day for the branch bank, then the process of FIG. 8 passes to step 450. In step 450, processing is performed to provide recommendation to the branch bank on shipment day of the branch bank. Such processing is also described below with reference to FIG. 11.

After either step 440 or step 450 (of FIG. 8), the process of FIG. 8 passes to step 460. In step 460, a recommendation of cash transfer to the particular branch bank has indeed been generated. Accordingly, step 460 reflects a notice of such cash transfer is output to the particular branch bank. In accordance with one embodiment of the invention, the branch bank may then provide feedback in response to the output cash transfer notice. Based on the feedback received from the branch bank, the recommended cash transfer may be varied appropriately. For example, the branch bank might indeed override the recommended cash transfer generated by the cash distribution date. In some embodiments, certain criteria might have to be satisfied so as to override a recommended cash transfer.

After step 460 of FIG. 8, the process passes to step 470. In step 470, the cash transfer is placed into a queue. This placement in to a queue is of course contingent upon not receiving any overriding feedback from the branch bank. Further details of placement of the cash transfer into queue is described below with reference to FIG. 12. After step 470 of FIG. 8, the process passes to step 480. In step 480, the process performs adjustment to the models which are utilized to generate the forecast. Further details of such adjustment of the models are described below with reference to FIG. 13. Then, the process passes to step 490.

In step 490, the process determines whether there are further branch banks to process. For example a further branch bank may have logged in and requested the cash distribution bank to make a recommendation of cash transfer. Alternatively, if the cash transfer recommendations are provided in a rolling manner (i.e., one branch bank is processed at a time), then step 490 simply reflects that the next branch bank in the rolling line-up will then be processed.

Accordingly, in step 490 if there are further branch banks to process, then the process returns to step 410 of FIG. 8. Alternatively, if no in step 490, i.e. there are no further branch banks to process, the process then passes to step 495. In step 495, the process returns to step 500 of FIG. 3.

FIG. 9 is a flowchart showing the "perform processing for the particular branch bank to make recommendation (including generating forecasted ending balance and forecasted cash in and cash out" step 420 of FIG. 8 in accordance with one embodiment of the invention. The processing of FIG. 9 might be performed at least in part by the analysis and forecasting portion 123, for example.

The process of FIG. 9 starts in step 420 and passes to step 422. In step 422, the process retrieves data (from the database in the cash distribution bank) that relates to the particular branch bank. Then, in step 423, the process retrieves data from the database related to any related branch banks i.e. for assessment of the particular branch bank. Thus, step 423 again reflects that data from a wide variety of branch banks may be utilized in conjunction with the forecasting of a particular branch bank. After step 423, the process passes to step 424. In step 424, the process retrieves general data from the database for assessment of the particular branch bank. Then, the process passes to step 425.

In step 425, the process applies the retrieved data i.e. the data retrieved in steps 422, 423 and 424, to forecast the cash needs of the particular branch bank. Further details of the forecasting of step 425 are described below with reference to FIG. 10. After FIG. 10, the process passes to step 428. In step 428, the process inputs values for (1) any pending orders that have not been received by the branch bank, (2) any pending orders that have not been shipped to the branch bank from the cash distribution bank, and (3) any approved pending emergency recommendations that have been ordered, but not received.

Accordingly, step 428, reflects that there may indeed be cash transfers in process which are not yet reflected in the balances shown at the particular branch bank. Such cash transfers that are in process would of course be considered in forecasting future cash needs of the particular branch bank. After step 428, the process passes to step 429. In step 429, the process returns to step 430 of FIG. 8.

FIG. 10 is a flowchart showing the "apply the retrieved data to forecast cash needs of the particular branch bank" step 425 of FIG. 9 in accordance with one embodiment of the invention. The processing of FIG. 10 might be performed at least in part by the analysis and forecasting portion 123, for example.

The process of FIG. 10 starts in step 425. In general, the processing of FIG. 10 reflects that a wide variety of techniques may be utilized to effect forecasting of cash needs for a particular brand bank. The various processing reflected in steps 4250-4259, as shown in FIG. 10, may be performed in serial or in parallel. Additionally, results from such various techniques may be synthesized or combined in some manner.

Specifically, step 4250 in FIG. 10 reflects that models may be applied to the retrieved data to generate a forecast for the particular branch bank. In step 4251, the process may utilize time series forecast processing. That is such time series forecast processing looks back in time to the same day, same week, same month (or some other prior time period). This is done to determine current cash needs i.e. cash needs in the current or future time. Further, as reflected in step 4252, the processing of FIG. 10 may include application of a predetermined set of rules to parameters retrieve data. That is, the forecasting performed may in one way or another utilize a set of rules. Further, in step 4253, the process retrieves information based on related location e.g. matching zip codes of branch banks and applies such data to generate a forecast.

Step 4255 reflects that a determination may be performed whether thresholds had been attained, so as to trigger a particular outcome. For example, normal and planned output to a particular branch bank might be varied if certain thresholds are attained. Also, step 4256 reflects that linear processing may be utilized to forecast cash needs of the branch bank. In step 4257, the process includes assessing cash needs of a particular branch bank by utilizing data from other similarly situated banks. Thus, step 4257 may relate to sharing of data between banks in the same geographical region. On the other hand, the processing of step 4258 may include similarly situated banks. For example, similarly situated banks might be those disposed in areas of similar population density, similar median income, or similar in some other manner. Also, step 4259, as noted above, reflects that the processing of the various techniques of FIG. 10 may be synthesized in some manner. For example, the outcome forecast of different techniques might be averaged so as to generate a final recommended cash transfer amount. In conjunction with such averaging, the outcome forecast of different techniques might be respectively weighted in some manner.

After the various steps 4250-4259, the process passes to step 425, as shown in FIG. 10. In step 426, processing is performed to generate an overall forecast for the bank. That is, in accordance with one embodiment of the invention, the overall balanced forecast might reflect a balance amount that is deemed appropriate with all parameters taken into consideration. Further, after step 426, the process passes to step 428. In step 428, processing is performed to generate both a "cash in forecast" as well as a "cash out forecast". That is, in step 428, the distribution bank estimates the amount of cash that will be incoming in a particular period of time as well as the estimated cash that will be outgoing in the particular period of time. After step 428, the process passes to step 425 prime. In step 425 prime, the process returns to step 428 of FIG. 9.

FIG. 11 is a diagram showing the processing of steps 440 and 450 of FIG. 8, in which processing is performed to provide a recommendation to the branch bank. FIG. 11 shows in further details the processing of FIG. 8. The processing of FIG. 11 might be performed at least in part by the analysis and forecasting portion 123, for example.

Specifically, FIG. 11 shows the processing of step 440 in which a recommendation is provided on the branch bank order day. In step 440-1, the system finds the last known actual ending balance. Then, in step 440-2, the system adds the forecasted cash ins and subtracts the forecasted cash outs for the period between the last known actual ending balance and the day the courier is to arrive. Then, in step 440-3, the system adds any pending order that has not yet been received. The system then subtracts any pending orders that have not been shipped. Then, in step 440-4, the system adds any approved pending emergency recommendations that have been ordered but not received.

This processing thus results in the projected ending balance for the day the courier is to arrive. Then, in step 440-5, the system subtracts the projected ending balance for the day the courier is to arrive from the forecasted ending balance for that day to calculate the real time order shipment amount.

Further, FIG. 11 shows the processing 450 to provide a recommendation on the branch bank shipment date. Such processing, as shown in FIG. 11, may be similar to the processing shown in step 440.

It is appreciated that the systems and methods of embodiments are not limited to the processing of FIG. 11. That is, various forecasting methodologies and various manipulations of the pertinent parameters might be used in generating forecasted results. For example, a simplistic methodology is to simply use values from the prior year (or from the prior month), for example. In particular, the values of forecasted cash ins, forecasted cash outs, and the forecasted ending balance might be simply derived from the prior year's activity.

Figure 12:
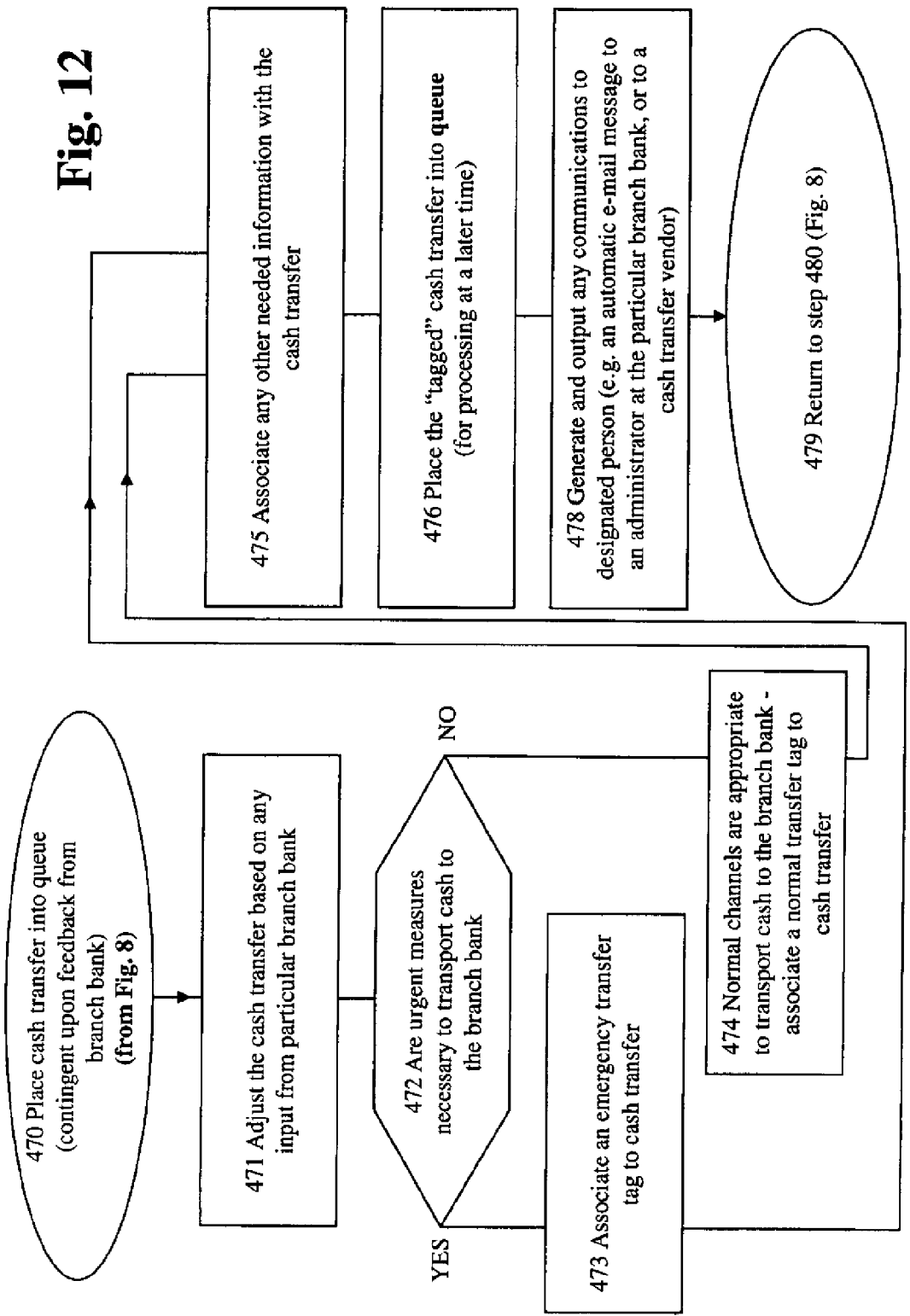
FIG. 12 is a flowchart showing the "place cash transfer into queue (contingent upon feedback from branch bank)" processing of FIG. 8 in accordance with one embodiment of the invention.

FIG. 12 is a flowchart showing the "470 place cash transfer into queue (contingent upon feedback from branch bank)" processing of FIG. 8 in accordance with one embodiment of the invention. The processing of FIG. 12 might be performed at least in part by the cash management tool 120, for example.

The process of FIG. 12 starts in step 470 in passes to step 471. In step 471, the processing adjusts the cash transfer based on any input that has been received from the particular branch bank. Then, in step 472, a determination is made whether there are urgent measures necessary to transport the cash to the branch bank. It should be appreciated such urgent measures might result if the branch bank is running very low on cash. As shown in FIG. 12, if there are emergency measures, then the process passes to step 473. In step 473, the cash transfer is associated with an emergency transfer tag. Thus, as described below, such association with an emergency transfer tag will trigger expedited processing of the cash transfer in accordance with one embodiment of the invention.

Alternatively, if no in step 472, i.e. there are not urgent measures necessary to transport the cash to the branch bank, then the process passes to step 474. In step 474, normal channels are appropriate to transport the cash to the branch bank. Accordingly, a normal transfer tag will be associated with such cash transfer. After both of steps 473 and 474 of FIG. 12, the process passes to step 475. In step 475, the process associates any other needed information with a cash transfer. For example, if any unique measures are to be taken in conjunction with the cash transfer, such may be associated with the cash transfer in step 475. For example, the "needed information" might include a note in the cash transfer to alert a particular administrator (at the branch bank) once that cash transfer has been received at the branch bank. After step 475 of FIG. 12, the process passes to step 476.

In step 476, the cash transfer is placed in to queue for processing at a later time, i.e. the tagged cash transfer is placed into queue. After step 476, the process passes to step 478. In step 478, the process generates and outputs any communications to designated persons. Such designated person might include an administrator at the particular branch bank or an administrator at a particular cash transfer vendor. For example, such communication might be performed over email or over phone, for example. The communications might alert the branch bank administrator that the cash transfer has been placed into queue. After step 478 of FIG. 12, the process passes to step 479. In step 479, the process returns to step 480 of FIG. 8.

Figure 13:
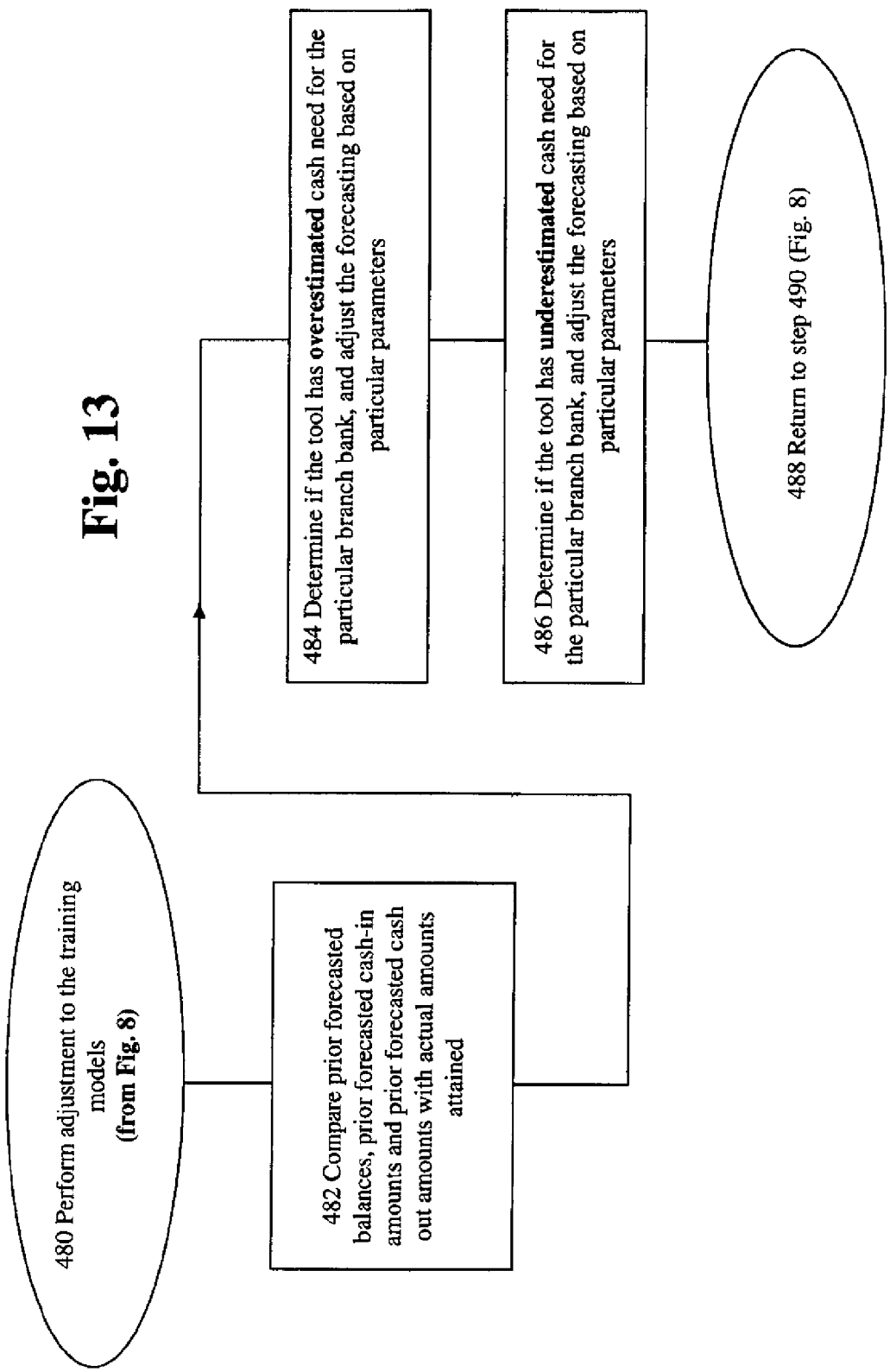
FIG. 13 is a flowchart showing the "perform adjustment to the training models" processing of FIG. 8 in accordance with one embodiment of the invention.

FIG. 13 is a flowchart showing the "perform adjustment to the training models" step 480 of FIG. 8 in accordance with one embodiment of the invention. The processing of FIG. 13 might be performed at least in part by the analysis and forecasting portion 123, for example.

The process of FIG. 13 starts in step 480, and passes to step 482. In step 482, the process compares prior forecasted balances prior forecasted cash in amounts and prior forecasted cash out amounts with actual amounts attained by the particular branch bank. In other words, step 482 of FIG. 13 reflects that forecasted data/amounts may be compared with actual attained amounts so as to determine the differential between such data. If the forecasted amounts are relatively accurate, the differential between such data should be minimal. Thus, processing may be performed regarding the accuracy of the forecasting. It is also appreciated that other techniques and/or other amounts may be utilized to determine the accuracy of the forecasting.

Further, in FIG. 13, steps 484 and 486 reflect that the forecasting may be adjusted based on the accuracy of prior forecasting. In step 484, the process determines if the processing has over estimated cash need for the particular branch bank. Based on any over estimation, the process adjusts the forecasting based on the particular parameters. In a similar manner, in step 486 of FIG. 13, the process determines if the processing has underestimated cash need for the particular branch bank. Based on such under estimation, the process adjusts the forecasting based on particular parameters.

For example, the adjustment of the forecasting based on particular parameters might include the variance of the weighting of parameters utilized in the forecasting and/or the variance in thresholds utilized in the forecasting. After step 486 of FIG. 13, the process passes to step 488. In step 488, the process returns to step 490 of FIG. 8.

Figure 14:
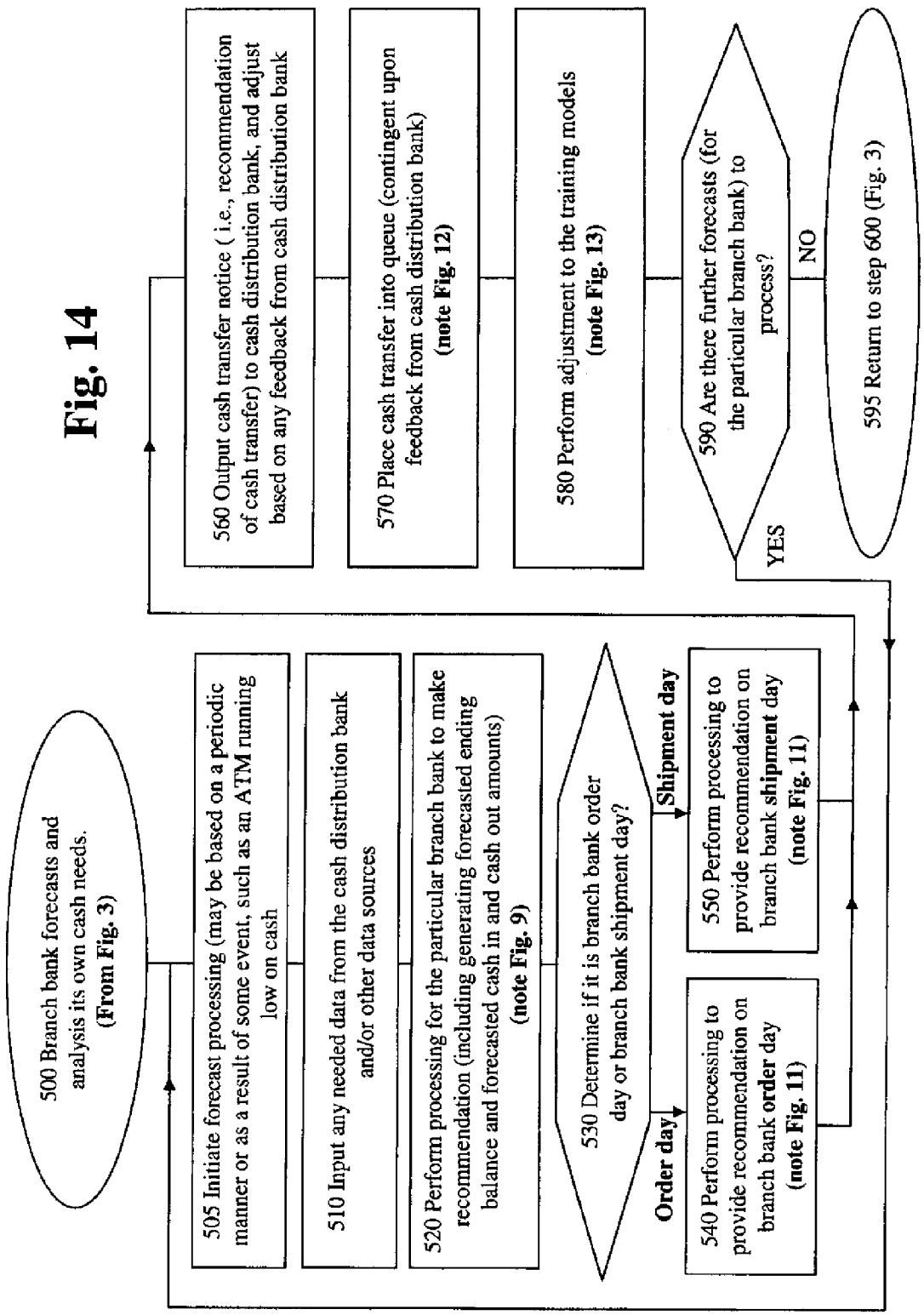
FIG. 14 is a flowchart showing the "branch bank forecasts and analysis its own cash needs" processing of FIG. 3 in accordance with one embodiment of the invention.

FIG. 14 is a flowchart showing the "branch bank forecasts and analysis its own cash needs" step 500 of FIG. 3 in accordance with one embodiment of the invention. The processing of FIG. 14 might be performed at least in part by the cash management tool 140 of the branch bank 130, for example.

FIG. 14 reflects that a particular branch bank may indeed perform its own forecasting based on the various data input on location of the particular branch bank as well as data input from the cash distribution bank, as described above. Thus, the processing of FIG. 14 may, in accordance with one embodiment of the invention, parallel the processing of FIG. 8 as described above.

The process of FIG. 14 starts in step 500, and passes to step 505. In step 505, the branch bank initiates forecast processing. This initiation might be based on a periodic manner or as a result of some event, for example. Such an event might be a trigger that an ATM is running low on cash. After step 505, the process passes to step 510. In step 510, the branch bank inputs any needed data from the cash distribution bank and/or inputs data from any other data sources, as desired. Then, the process passes to step 520. In step 520, the process performs processing for the particular branch bank to make a recommendation, including generating forecasted ending balance and forecasted cash in and cash out amounts. The processing of step 520 may be performed in a similar manner as described above with reference to FIG. 9. After step 520, the process passes to step 530. In step 530, the processing at the branch bank determines if it is branch bank order day or a branch bank shipment day. Depending upon the determination of step 530, the process then proceeds to either step 540 or step 550. The processing of step 550 and/or step 550 may be performed in a similar manner to the processing of FIG. 11, as described above.

After either of step 540 or step 550 of FIG. 14, the process passes to step 560. In step 560, the process outputs a cash transfer notice i.e. a recommendation of cash transfer to the cash distribution bank. Thereafter, an adjustment is made based on any feedback from the cash distribution bank. Thus, the processing of step 560 of FIG. 14 is similar in manner to the processing of step 460 of FIG. 8 except that the branch bank outputs the notice to the cash distribution bank.

Then, the process passes to step 570. In step 570, the process places the cash transfer into queue. This placement of the cash transfer into queue may well be contingent upon feedback from the cash distribution bank. For example, the particular cash distribution bank may need to check that indeed funds are available (or expected to be available) so as to satisfy the cash transfer. The processing of step 570 may be performed in a similar manner to that described above with reference to FIG. 12. After step 570, the process passes to step 580. In step 580, the process performs an adjustment to the training models, i.e. in a manner similar to FIG. 13 described above. After step 580, the process passes to step 590. In step 590, the process determines whether there are further forecasts for the particular branch bank to process. For example, both a teller window forecast may be desired as well as an ATM forecast. If there are indeed further forecasts to process, then the process passes to step 505. Thereafter the processing proceeds as described above.

Alternatively, if in step 590 there are no further forecasts to process, then the process passes to step 595. In step 595, the process returns to step 600 of FIG. 3.

Figure 15:
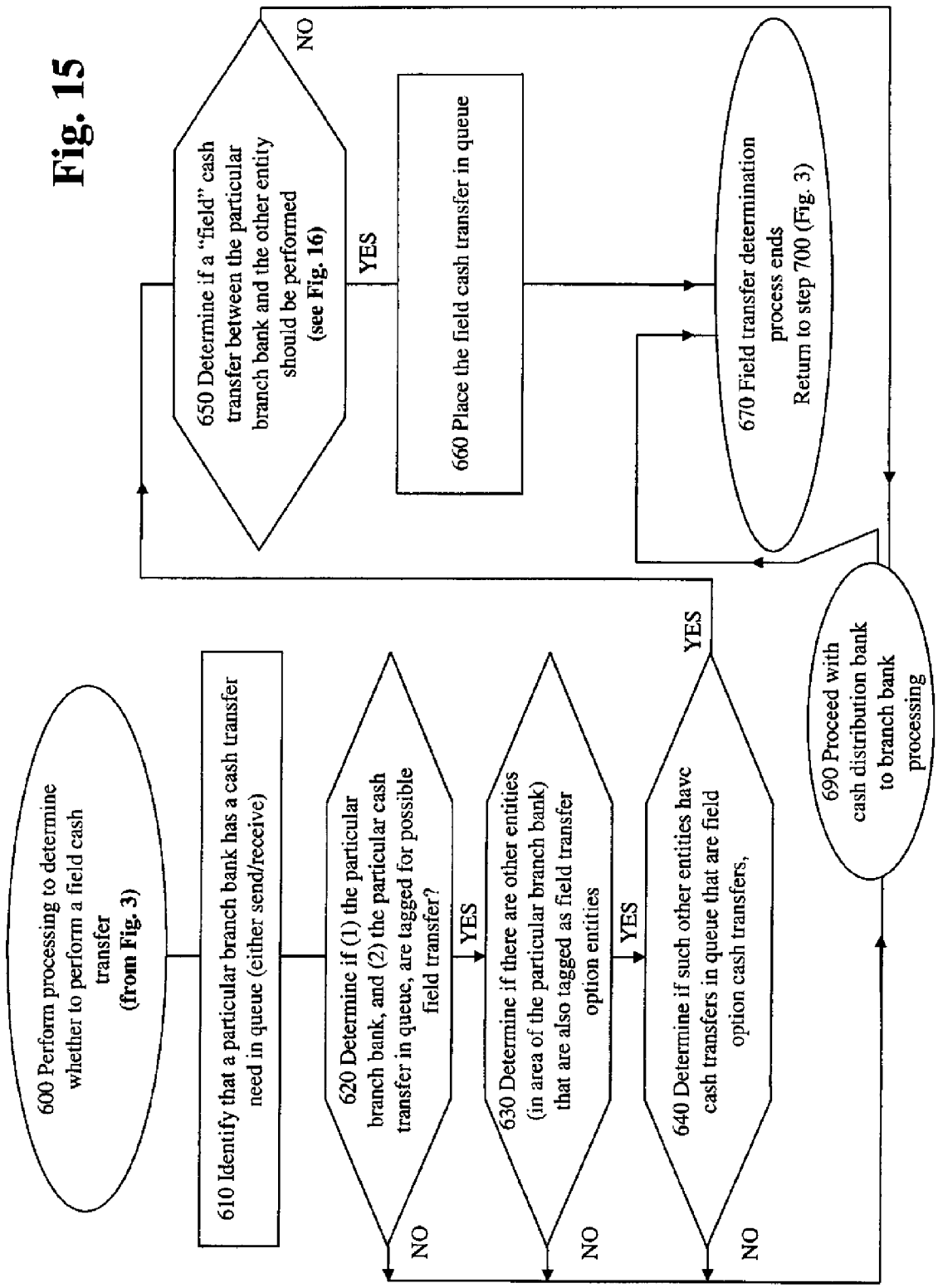
FIG. 15 is a flowchart showing the "perform processing to determine whether to perform a field cash transfer" processing of FIG. 3 in accordance with one embodiment of the invention.

FIG. 15 is a flowchart showing the "600 perform processing to determine whether to perform a field cash transfer" processing of FIG. 3 in accordance with one embodiment of the invention. The processing of FIG. 15 might be performed at least in part by the field cash transfer analysis portion 126, for example.

FIG. 15 reflects that the systems and methods of embodiments may involve "field cash transfers" meaning herein that the cash transfer is not with a cash distribution bank; but rather the cash transfer is between two branch banks and/or between a branch bank and some other entity. For example, such field cash transfer might involve a transfer of cash between a retail merchant and a branch bank. Thus, in such a field cash transfer, no cash is either transferred to or from the cash distribution bank. However, it may well be that indeed data from the cash distribution bank is utilized in the field cash transfer.

As shown in FIG. 15, the process starts in step 600 and passes to step 610.

In step 610, the process identifies that a particular branch bank has a cash transfer need in queue. This cash transfer might be either a request to send cash or a request to receive cash. As described herein, the cash transfer is associated with various parameters, including amount of cash and time line, for example. After step 610, the process passes to step 620.

In step 620, the process determines if the particular branch bank is tagged as a possible field cash transfer branch bank. That is, it may be that some branch banks simply do not do field cash transfers. Also, in step 620, the process determines if the particular cash transfer in queue is tagged for possible field transfer. That is, it may be the case that even though the particular branch bank does indeed do field cash transfers, it has been deemed that this particular cash transfer should not be effected via field cash transfer. For example, it might be that only cash transfers under a certain amount may be effected via field cash transfer.

In step 620, if (1) the particular branch bank is designated as a field cash transfer, and (2) the particular cash transfer in queue is designated as possible field transfer, then the process passes to step 630. Otherwise, the process passes to step 690.

In step 690, it has been deemed that a field cash transfer is not appropriate. Accordingly, such cash transfer will be effected using a cash distribution bank to branch bank transaction, as described above.

On the other hand, if yes in step 620, then in step 630, further processing is performed to determine whether to effect a field cash transfer. That is, in step 630, the process determines if there are other entities (in the geographical area of the particular branch bank) that are also tagged as field transfer option entities. This determination might be performed utilizing zip codes or some other location based system. For example, the GPS location of the particular entities (branch banks and other merchants) might be utilized. If no in step 630, the process passes to step 690.

If the determination is yes in step 630, then the process passes to step 640. In step 640, the process determines if such other entities have cash transfers in queue that are field option cash transfers. That is, it may be the case that even though the particular entity does indeed utilize field cash transfers, the particular cash transfer in queue is not processable by field cash transfer. If no in step 640, the process passes to step 690. On the other hand, if the determination is yes in step 640, then the process passes to step 650.

In short, prior to step 650, the process of FIG. 15 determines if a field cash transfer is even viable. Step 650 then determines if a field cash transfer makes sense from a business perspective. Further details of step 650 are described below with reference to FIG. 16.

Upon the processing of step 650 being completed, the process moves on. That is, if no in step 650, (the field cash transfer should not be performed) the process passes to step 690. Step 690 is described above. On the other hand, if yes in step 650, the process passes to step 670. In step 670, the field cash transfer determination process ends. From both step 660 and step 690, the process passes to step 670. In step 670, the process passes to step 700 of FIG. 3.

Figure 16:
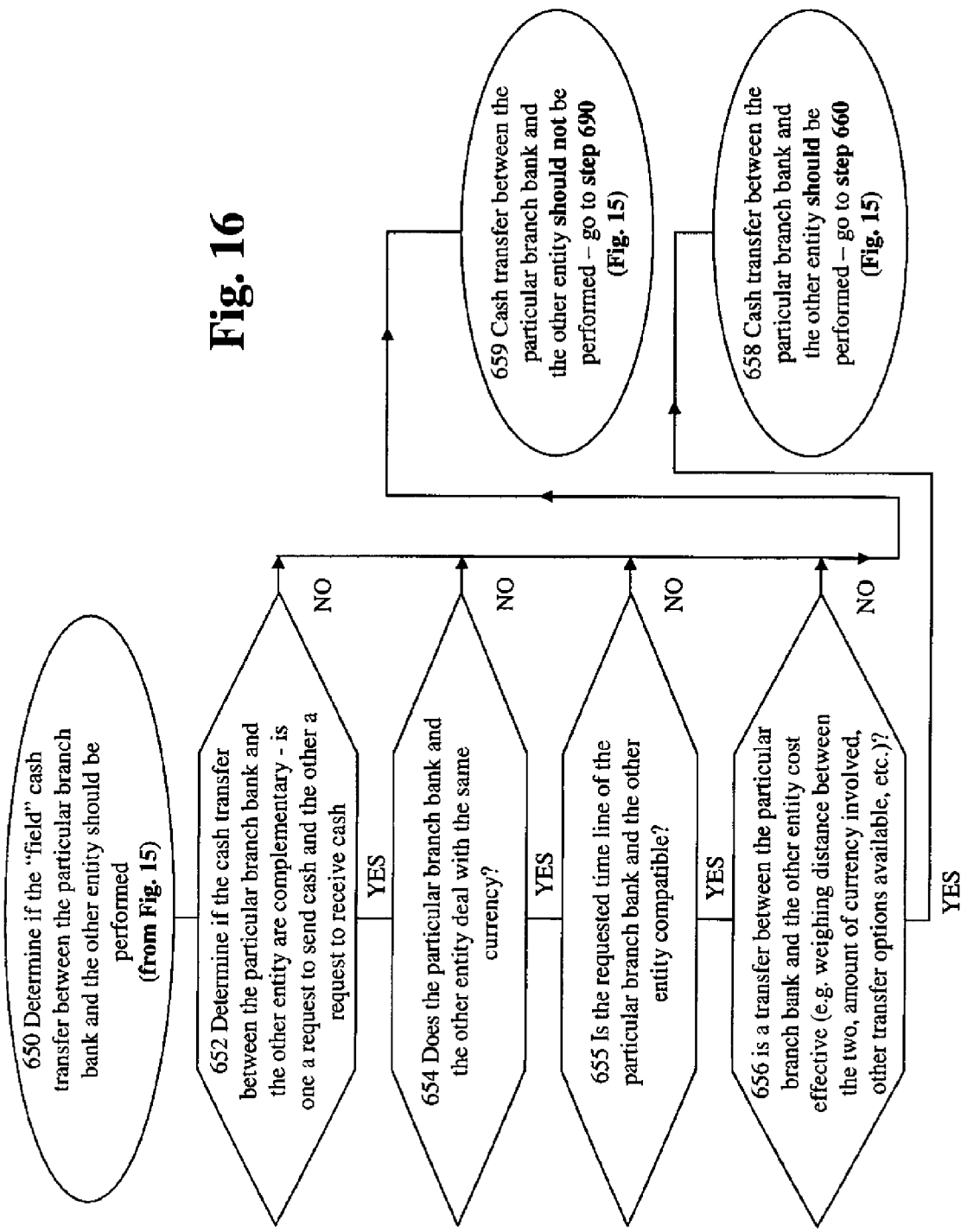
FIG. 16 is a flowchart showing the "determine if the cash transfer between the particular branch bank and the other entity should be performed" processing of FIG. 15 in accordance with one embodiment of the invention.

FIG. 16 is a flowchart showing the "determine if a "field" cash transfer between the particular branch bank and another other entity should be performed" step 600 of FIG. 15 in accordance with one embodiment of the invention. The processing of FIG. 16 might be performed at least in part by the field cash transfer analysis portion 126, for example.

The process of FIG. 16 starts in step 650 and passes to step 652. In step 652, the process determines if a cash transfer between the particular branch bank and the other entity are complementary. In other words, is one a request to send cash, and the other a request to receive cash. As can be appreciated, if both requests are requests to receive cash, then the requests are not complementary.

If no in step 652, i.e. the requested cash transfers are not complimentary, then the process passes to step 659. In step 659, the processing concludes that the cash transfer between the particular branch bank and the other entities should not be performed. Accordingly, the process returns to step 690 of FIG. 15.

On the other hand if yes in step 652, i.e. the requested transactions are complimentary, then the passes to step 654. In step 654, the process determines whether the particular branch bank and the other entity deal with the same currency. If no, then the process again passes to step 659 and the field cash transfer should not be performed. On the other hand, if yes in step 654 then the process passes to step 655. In step 655, the process determines whether the requested time line of the particular branch bank requested cash transfer and the cash transfer of the other entity are compatible. That is, for example, if the desired time windows of the requested transactions do not overlap, then the time line of the requests are not compatible. Accordingly, if no in step 655, the process passes to step 659. On the other hand, if yes in step 655, then the process passes to step 656 for further processing.

In step 656, the process determines whether the transfer between the particular branch bank and the other entity is cost effective. Various considerations may be taken into account in determining the cost effectiveness of the possible field cash transfer. For example, various parameters may be weighed against each other including the distance between the two entities, the amount of currency involved, and the other transfer options available, as well as other considerations. For example, if one of the entities is within very close proximity to the cash distribution bank, then a field cash transfer may not be desirable. Accordingly, if in step 656 it is determined that the transfer between the particular branch bank of the other entity is not cost effective then the process again passes to step 659. On the other hand, if yes in step 656, i.e. the field cash transfer is cost effective, then the process passes to step 658. In step 658, the processing concludes that a field cash transfer between the particular cash bank and the other entity should be performed. Thereafter, the processing passes to step 660 of the FIG. 15. As described above, the field cash transfer is then placed into queue (as reflected in step 660 of FIG. 15).

FIG. 17 is a flowchart showing "the requests for cash for branch banks are processed to determine the cash transport vendor to utilize" step 700 of FIG. 3 in accordance with one embodiment of the invention. The processing of FIG. 17 might be performed at least in part by the cash transport vendor processing portion 127, for example.

The process of FIG. 17 starts in step 700. Thereafter, the process passes to step 710. In step 710, the process identifies a particular branch bank to process regarding cash transfers. Then, in step 720, the process determines that there is indeed a requested cash transfer in queue for that particular branch bank. Then, the process passes to step 730.

In step 730, the process outputs a notice to the particular branch bank, so as to alert them of a planned cash transfer. In accordance with one embodiment of the invention, the processing then waits for confirmation from the branch bank if required. Such confirmation might depend on the variance of that particular cash transfer from the norm cash transfer. For example, if a substantial larger amount of cash is being transferred vis-à-vis the norm, then confirmation may be required from the particular branch bank (prior to proceeding with the cash transfer). After step 730 of FIG. 17, the process passes to step 740.

In step 740, the processing performs a check to determine if there is any information or data that has been received that alters the planned cash transfer. In the processing of step 740, the cash transfer is adjusted based on any such information that is received, i.e. such information might be received in response to the notice generated in step 730. After step 740, the process passes to step 750. In step 750, the processing is initiated to effect cash transfer to the particular branch bank. Relatedly, in step 760, the processing determines whether there is a predetermined cash transport vendor for the particular branch bank. That is, given the particular cash transfer being processed, and based on the parameters of such cash transfer, has a cash transport vendor been predetermined. If yes, then in step 762, the process contacts the predetermined cash transport vendor and instructs such vendor to make the cash transfer.

On the other hand, if no in step 760, then the process passes to step 770. In step 770, the process performs processing to identify and instruct a cash transport vendor to effect the transfer. Further details of the processing of step 770 are described below with reference to FIG. 18. After either of step 762 or step 770, the process passes to step 780. In step 780, the process returns to step 800 of FIG. 3.

Figure 18:
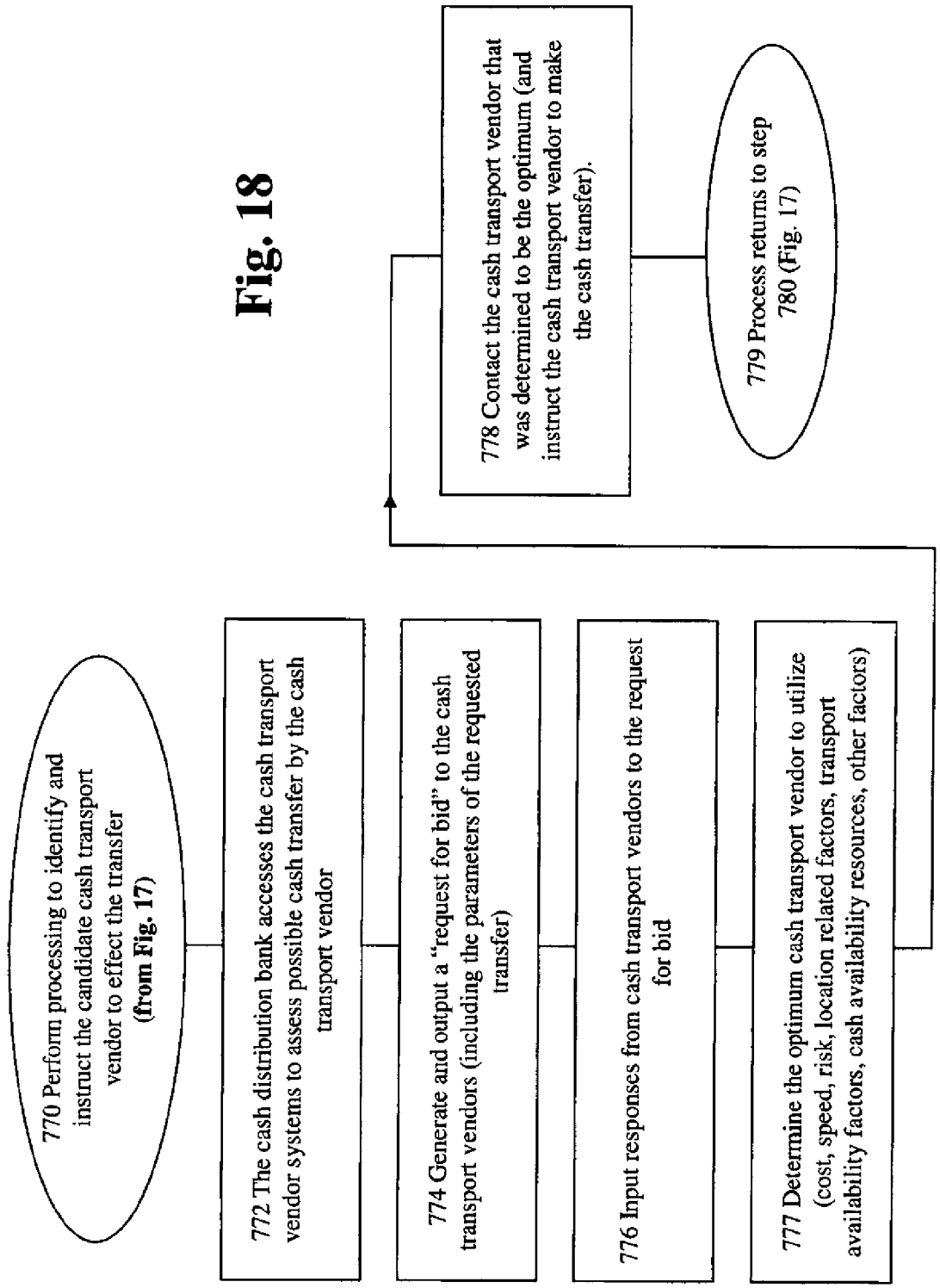
FIG. 18 is a flowchart showing the "perform processing to identify and instruct the candidate cash transport vendor to effect the transfer" processing of FIG. 17 in accordance with one embodiment of the invention.

FIG. 18 is a flowchart showing the "perform processing to identify and instruct the candidate cash transport vendor to effect the transfer" step 770 of FIG. 17 in accordance with one embodiment of the invention. The processing of FIG. 18 might be performed at least in part by the cash transport vendor processing portion 127, for example.

The process of FIG. 18 starts in step 770 and passes to step 772. In step 772, the cash distribution bank accesses the cash transport vendor system to assess possible cash transfer by the cash transport vendor. That is, step 772 reflects that the cash distribution bank (or a branch bank) may indeed have access or at least limited access to the respective systems of the cash distribution vendors. For example, the cash transport vendor might allow the cash distribution bank to access the cash transport vendors database. Such access would allow the cash distribution bank to assess availability of the cash transport vendor, for example. After step 772, the process passes to step 774.

In step 774, the process generates and outputs a request for bid to the cash transport vendors that are potentially available to satisfy the cash transfer. The request for bid, which is output to the cash transport vendors, includes the parameters of the requested transfer. For example the parameters might include the amount of cash being transferred, the time line of the transfer, and/or other information associated with the cash transfer. After step 774, the process passes to step 776.

In step 776, the process inputs the responses (from the cash transport vendors) to the request for a bid. It is appreciated that in accordance with some embodiments of the invention, the generation of a response by the cash transport vendor, as well as the generation of the initial bid, may well be automated. After step 776, the process passes to step 777.

In step 777, the process determines the optimum cash transport vendor to utilize. This determination might include consideration of a variety of factors, which might be characterized as "consideration factors", including cost; timing issues; location of the cash distribution bank, branch bank and cash transport vendor; transport availability factors; cash availability resources, and other factors. After step 777, the process passes to step 778.

In step 778, the cash transport vendor, which that was determined to be the optimum cash transport vendor in step 777, is contacted. That is, in step 778, the cash transfer vendor is contacted and instructed to effect the requested cash transfer. The process then passes to step 779. In step 779, the process returns to step 780 of FIG. 17.

Figure 19:
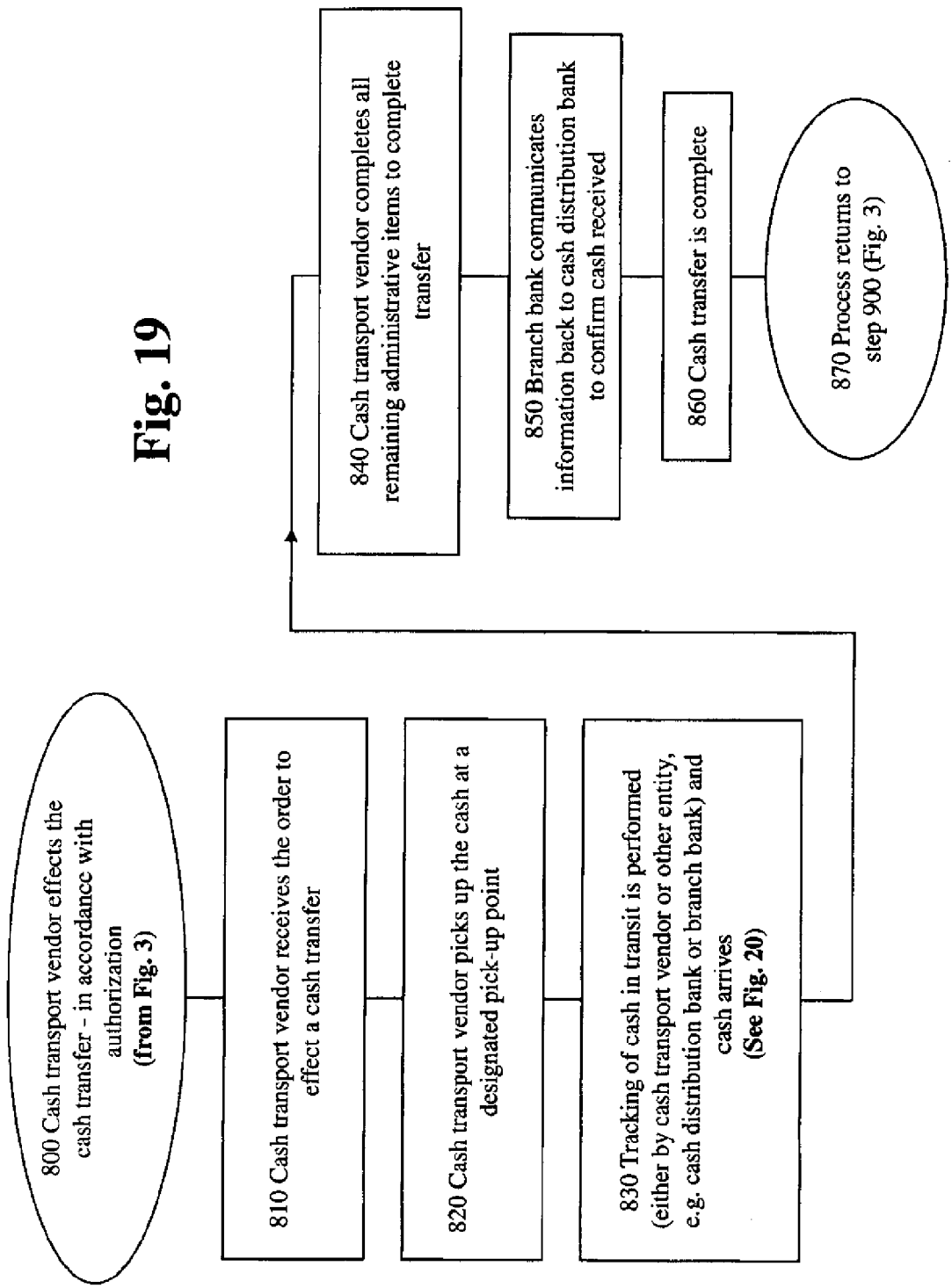
FIG. 19 is a flowchart showing the "cash transport vendor effects the cash transfer—in accordance with authorization" processing of FIG. 3 in accordance with one embodiment of the invention.

FIG. 19 is a flowchart showing the "cash transport vendor effects the cash transfer—in accordance with authorization" step 800 of FIG. 3 in accordance with one embodiment of the invention.

The process of FIG. 19 starts in step 800 and passes to step 810. In step 810, the cash transport vendor receives the order to effect a cash transfer. Then, in step 820, the cash transport vendor picks up the cash at a designated pickup point, e.g. the cash distribution bank (if the transfer is from a cash distribution bank) or a branch bank (if the transfer is from a branch bank) or another entity (such as a retail merchant if the transfer is from such retail merchant). Then the process passes to step 830.

In step 830, the tracking of cash in transit is performed. This tracking might be performed by the cash transport vendor itself, the cash distribution bank, or the branch bank. Alternatively, a third party might monitor the cash in transit. Further details of the tracking of cash in transit are described below with reference to FIG. 20. After step 830 of FIG. 19, the process passes to step 840.

In step 840, the cash transport vendor completes all remaining administrative items to complete the cash transfer. Then in step 850, the branch bank communicates information back to the cash distribution bank to confirm that the cash was received. Accordingly, step 860 of FIG. 19 reflects that the cash transfer is complete. The process passes to step 870. In step 870, the process returns to step 900 of FIG. 3.

FIG. 20 is a flowchart showing the "tracking of cash in transit is performed" step 830 of FIG. 19 in accordance with one embodiment of the invention. The processing of FIG. 20 might be performed at least in part by the cash transfer tracking portion 128 in the cash management tool 120, for example.

FIG. 20 is a flowchart showing in further detail the processing of step 830 of FIG. 19. After the process of FIG. 20 starts in step 830, the process passes to step 832. In step 832, the process documents the particulars of the cash transfer prior to departure of the shipment. For example, documentation is taken of the currencies involved, the number of bills, the denominations, the coin count, the time of departure, and/or any other desired criteria. Then, the process passes to step 834. In step 834, the process determines the anticipated route of the cash in transit. This determination may utilize information provided by the cash transport vendor. In particular, the anticipated route of the cash transfer is determined such that any variance from such route may be closely scrutinized. After step 834, the process passes through step 835.

In step 835, a transmitter is associated with the cash so as to monitor the cash during shipment. Various transmitters may be utilized to perform such monitoring. For example, a GPS transformer might be utilized and/or and RFID transmitter. After step 835, the process passes to step 836. In step 836, the process monitors the ongoing route of the cash transfer using the transmitters or some other tracking device. The process generates an alert if the cash route varies from the expected route. Then, the process passes to step 838.

In step 838, the particulars of the cash is documented upon arrival of the shipment at the branch bank. Accordingly, the documentation of the particulars performed in step 838 may be compared against the particulars obtained via step 832 of FIG. 20. After step 838 of FIG. 20, the process passes to step 839. In step 839, the process returns to step 840 of FIG. 19.

The systems and methods of embodiments of the invention utilize computer implementation at various levels. Such is illustrated by the block diagram operating system of FIGS. 1 and 2. Relatedly, a user (such as an administrator) may interface with the banking cash distribution system 100 using a suitable user interface. Relatedly, FIG. 21 is a diagram showing a user interface displaying a summary of branch cash in accordance with one embodiment of the invention. FIG. 22 is a diagram showing a user interface displaying a summary of ATM balances over a period of time in accordance with one embodiment of the invention.

The user interfaces of FIGS. 21 and 22, and similar user interfaces, may be utilized by the banking cash distribution system 100 to convey a wide variety of information to a user, as well as to input information from a user. For example, FIG.

21 provides data regarding cash balances at particular ATMs (Automated Teller Machines). FIG. 22 provides various information regarding branch cash balances, history, and other related information.

Other user interfaces may of course be used to output information to and input information from a user. The banking cash distribution system 100, and in particular the various processing components in the banking cash distribution system 100, are provided with processing systems to handle such exchange of information between the systems and a user.

Hereinafter, further aspects of implementation of the invention will be described. As described above, FIGS. 1, 2, 21 and 22 show embodiments of a system of the invention. Further, FIGS. 3-20 show various steps of one embodiment of the method of the invention.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the process of the invention.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

What is claimed is:

1. A computer implemented method for transferring cash with a particular branch bank, the method comprising the steps of:
   receiving first data relating to cash usage at a plurality of branch banks;
   receiving second data relating to cash usage at the particular branch bank, the second data including a known ending balance at the particular branch bank;
   generating forecasting data based on the first data and the second data to determine a current cash need;
   performing forecast processing to determine an amount of cash to be transferred to or from the particular branch bank, the forecast processing including:
      forecasting a cash in amount and forecasting a cash out amount based on the forecasting data, and generating a projected ending balance based on the forecasted cash in amount, the forecasted cash out amount, and the known ending balance;
      generating a forecasted ending balance based at least in part on historical data associated with the particular branch bank; and
      comparing the projected ending balance with the forecasted ending balance to determine a cash shipment amount;
   generating a cash transfer request based on the cash shipment amount;
   determining an anticipated route for a transfer of cash;
   effecting the transfer of cash with the branch bank based on the cash transfer request using the anticipated route;
   monitoring the transfer of cash using a global positioning device; and
   generating an alert when the transfer of cash diverges from the anticipated route.

2. The method of claim 1, wherein the transfer of cash is between the particular branch bank and a cash distribution bank.

3. The method of claim 1, wherein the transfer of cash is between the particular branch bank and another branch bank.

4. The method of claim 1, wherein the transfer of cash is between the particular branch bank and a merchant.

5. The method of claim 1, further comprising receiving community event information; and including the community event information in the forecasting data, such that the community event information is used in the forecast processing; and associating the community event information with the particular branch bank using geographical information wherein the geographical information is a zip code associated with the community event information and a zip code associated with the particular branch bank.

6. The method of claim 1, further comprising receiving weather information; and including the weather information in the forecasting data, such that the weather information is used in the forecast processing.

7. The method of claim 1, further comprising associating the cash transfer request with tag information, the tag information including special instructions for the cash transfer.

8. The method of claim 7, wherein the tag information reflects an urgent transfer of cash.

9. A computer implemented system for transferring cash with a particular branch bank, the system comprising:
a processor; and
a memory comprising computer-readable instructions which when executed by the processor cause the processor to perform the steps comprising:
receiving first data relating to cash usage at a plurality of branch banks;
receiving second data relating to cash usage at the particular branch bank, the second data including a known ending balance at the particular branch bank;
generating forecasting data based on the first data and the second data to determine a current cash need;
performing forecast processing to determine an amount of cash to be transferred to or from the particular branch bank, the forecast processing including:
forecasting a cash in amount and forecasting a cash out amount based on the forecasting data, and generating a projected ending balance based on the forecasted cash in amount, the forecasted cash out amount, and the known ending balance;
generating a forecasted ending balance based at least in part on historical data associated with the particular branch bank; and
comparing the projected ending balance with the forecasted ending balance to determine a cash shipment amount;
generating a cash transfer request based on the cash shipment amount;
determining an anticipated route for a transfer of cash;
effecting the transfer of cash with the branch bank based on the cash transfer request using the anticipated route;
monitoring the transfer of cash using a global positioning device; and
generating an alert when the transfer of cash diverges from the anticipated route.

10. The system of claim 1, wherein the transfer of cash is between the particular branch bank and a cash distribution bank.

11. The system of claim 1, wherein the transfer of cash is between the particular branch bank and another branch bank.

12. The system of claim 1, wherein the transfer of cash is between the particular branch bank and a merchant.

13. The system of claim 1, wherein the processor further performs:
receiving community event information; and including the community event information in the forecasting data, such that the community event information is used in the forecast processing; and
associating the community event information with the particular branch bank using geographical information wherein the geographical information is a zip code associated with the community event information and a zip code associated with the particular branch bank.

14. The method of claim 1, wherein the processor further performs:
receiving weather information; and including the weather information in the forecasting data, such that the weather information is used in the forecast processing.

15. The method of claim 1, wherein the processor further performs:
associating the cash transfer request with tag information, the tag information including special instructions for the cash transfer wherein the tag information reflects an urgent transfer of cash.

16. A system that determines a cash transport vendor to use to satisfy a cash transfer request that includes transfer of a cash shipment amount, from a first location to a second location, the system including:
a communication portion that:
receives first data relating to the first location and the second location; and
receives second data including cash transport vendor information; and
a processing portion that:
determines, based on the first data and the second data, a plurality of cash transport vendors that are available to satisfy the cash transfer request;
determines an optimum cash transport vendor to utilize, to satisfy the cash transfer request, out of the plurality of cash transport vendors that are available; and
outputs data, to the communication portion, to effect the transfer of the cash transfer request from the first location to the second location, using the optimum cash transport vendor; and
the system further:
performing forecast processing to determine an amount of cash to be transferred by the cash transport vendor, the forecast processing including:
forecasting a cash in amount and forecasting a cash out amount based on forecasting data, and generating a projected ending balance based on the forecasted cash in amount, the forecasted cash out amount, and a known ending balance;
generating a forecasted ending balance based on historical data from a prior time period; and
comparing the projected ending balance with the forecasted ending balance to determine a cash shipment amount; and
generating the cash transfer request based on the cash shipment amount.

17. The system of claim 16, wherein the first location is a cash distribution bank and the second location is a branch bank.

18. The system of claim 16, wherein the first location is a branch bank and the second location is a branch bank.

19. The system of claim 16, wherein the processing portion determining an optimum cash transport vendor to utilize includes consideration of each of:
the first location;
the second location; and
location of the plurality of cash transport vendors that are available to satisfy the cash transfer request.

20. The system of claim 19, wherein the processing portion determining an optimum cash transport vendor to utilize further includes consideration of timing of the transfer of the cash shipment amount.

* * * * *